US012685262B2

(12) United States Patent
Baert

(10) Patent No.: US 12,685,262 B2
(45) Date of Patent: Jul. 21, 2026

(54) PROCESSING MACHINE FOR PROCESSING FIBER PLANTS

(71) Applicant: HYLER BV, Sint-Baafs-Vijve (BE)

(72) Inventor: Niels Baert, Sint-Baafs-Vijve (BE)

(73) Assignee: HYLER BV, Sint-Baafs-Vijve (BE)

( * ) Notice: Subject to any disclaimer, the term of this patent is extended or adjusted under 35 U.S.C. 154(b) by 351 days.

(21) Appl. No.: 18/580,511

(22) PCT Filed: Jul. 18, 2022

(86) PCT No.: PCT/IB2022/056599
§ 371 (c)(1),
(2) Date: Jan. 18, 2024

(87) PCT Pub. No.: WO2023/002346
PCT Pub. Date: Jan. 26, 2023

(65) Prior Publication Data
US 2024/0324510 A1 Oct. 3, 2024

(30) Foreign Application Priority Data
Jul. 19, 2021 (BE) .................................. 2021/5563

(51) Int. Cl.
*A01D 45/06* (2006.01)
*A01D 57/20* (2006.01)
(52) U.S. Cl.
CPC ............. *A01D 45/06* (2013.01); *A01D 57/20* (2013.01)
(58) Field of Classification Search
CPC ........ A01B 39/18; A01D 57/22; A01D 57/20; A01D 43/082; A01D 45/065; A01D 45/16; A01D 45/28; A01D 45/06
See application file for complete search history.

(56) References Cited

U.S. PATENT DOCUMENTS 2,855,058 A * 10/1958 Krier ...................... A01D 45/28
171/42
3,460,326 A * 8/1969 Holm ..................... A01D 45/00
171/61
(Continued)

FOREIGN PATENT DOCUMENTS

AT 389028 B 10/1989
BE 1027336 A1 1/2021
(Continued)

OTHER PUBLICATIONS

International Search Report and Written Opinion of the ISA for PCT/IB2022/056599 mailed Nov. 4, 2022, 16 pages.
(Continued)

*Primary Examiner* — Adam J Behrens
(74) *Attorney, Agent, or Firm* — NIXON & VANDERHYE

(57) ABSTRACT

A processing machine for processing fiber plants includes a self-propelling vehicle including a vehicle chassis and a processing unit mounted on the vehicle chassis. The processing unit has a transport installation for transporting the fiber plants to the self-propelling vehicle. The transport installation includes a number of guide rollers mounted on the support frame, at least one pair of endless conveyor belts guided along the rollers and at least one drive for driving at least a part of the guide rollers. The guide rollers include a group of at least two pressing rollers which are configured to press against a first side of a conveyor belt at two or more positions. The transport installation further includes a support member on which the pressing rollers are arranged rotatably and in which the support member is mounted on the support frame rotatably relative to an imaginary rotation point.

33 Claims, 17 Drawing Sheets

(56)                    References Cited

U.S. PATENT DOCUMENTS

| | | | | | |
|---|---|---|---|---|---|
| 3,854,272 | A | * | 12/1974 | Lane, III ............. | A01D 43/083 |
| | | | | | 56/119 |
| 3,940,913 | A | * | 3/1976 | Wallenfang ......... | A01D 43/082 |
| | | | | | 56/119 |
| 5,632,135 | A | * | 5/1997 | Baker, IV ........... | A01D 45/065 |
| | | | | | 460/24 |
| 12,408,591 | B2 | * | 9/2025 | Van Puyvelde ........ | A01D 57/20 |
| 2024/0365708 | A1 | | 11/2024 | Baert | |

FOREIGN PATENT DOCUMENTS

| | | | | | |
|---|---|---|---|---|---|
| CN | 201238474 | Y | | 5/2009 | |
| CN | 209705210 | U | | 11/2019 | |
| CN | 117897048 | A | | 4/2024 | |
| EP | 3272202 | A1 | * | 1/2018 | ............. A01D 45/06 |
| FR | 1281756 | A | * | 1/1962 | ............. A01D 45/06 |
| FR | 3066881 | A1 | * | 12/2018 | ............. A01D 45/06 |
| FR | 3097717 | A1 | * | 1/2021 | ............. A01D 45/06 |

OTHER PUBLICATIONS

Office Action, issued in Chinese Patent Application No. 202280051139.1 dated Jan. 14, 2026.

* cited by examiner

PROCESSING MACHINE FOR PROCESSING FIBER PLANTS

This application is the U.S. national phase of International Application No. PCT/IB2022/056599 filed Jul. 18, 2022 which designated the U.S. and claims priority to BE Patent Application No. 2021/5563 filed Jul. 19, 2021, the entire contents of each of which are hereby incorporated by reference.

The present invention relates to a processing machine for processing fibre plants, for instance relative short fibre plants such as flax, and/or relatively long fibre plants such as hemp.

The processing of fibre plants can comprise inter alia of picking or picking up the fibre plants. The picking or picking up of fibre plants can take place inter alia by means of processing machines which are configured to grip the fibre plants by means of one or more pairs of endless conveyor belts. These endless conveyor belts are guided along guide rollers which are supported on a frame. The endless conveyor belts can form part of a picking unit for picking fibre plants rooted in a ground or can form part of a pick-up unit for picking up previously picked fibre plants which have been placed down on the ground (in order to have the fibre plants undergo a retting process).

In some cases the guide rollers and conveyor belts may be or become disposed adversely relative to each other, whereby the picking or picking up takes place in less effective manner and/or destructive forces are exerted on the picking or pick-up unit. It is further possible for one or more folds to result in the conveyor belts, which folds may impede correct picking or picking up and further transport of the picked or picked-up fibre plants. This may occur particularly—though not exclusively—at the rollers which are positioned nearest the front of the picking or pick-up unit, since they are often subjected to the greatest external forces. This may occur when the guide rollers and conveyor belts are not mounted sufficiently accurately on the frame in the first instance, but for instance also because the rollers and conveyor belts shift or become damaged due to the forces acting on the rollers and conveyor belts during use, for instance when the conveyor belts are subjected to a great deal of resistance when gripping or objects which are too large end up between the conveyor belts and guide rollers (for instance when gripping in the ground). This may also occur when folds result in the conveyor belts due to external causes and/or due to contamination of the rollers and conveyor belts and surrounding components during use of the processing machine.

It may be attempted to obviate or reduce one or more of these drawbacks of the known processing machines by placing the rollers and conveyor belts more accurately during mounting, by performing regular maintenance and by regularly cleaning the conveyor belts and guide rollers. The processing machine will here often require at least partial disassembly. This approach to reducing said problems is however labour-intensive, interrupts work and is relatively complex. Furthermore, not all the above stated and other drawbacks of the known processing machines have been obviated hereby yet.

It is an object of the invention to provide an improved processing machine and method for processing fibre plants wherein at least one of the stated and/or other drawbacks of the known processing machines is obviated.

It is a further object of the invention to provide a processing machine wherein a less exact positioning of rollers and conveyor belts is necessary in order to support a correct processing.

It is a further object of the invention to provide a processing machine wherein problems in respect of the arrangement of the rollers and conveyor belts, for instance the formation of a fold in a conveyor belt, can be solved more easily and/or quickly.

According to a first aspect, at least one of these objects is achieved at least partially in a processing machine for processing fibre plants, comprising:

- a self-propelling vehicle, comprising a vehicle chassis with arranged thereon a number of wheels and a drive motor for driving at least two wheels;
- a processing unit configured to pick fibre plants or pick them up from a ground surface, the processing unit comprising:
  - a support frame pivotally mounted or mountable on the vehicle chassis;
  - a transport installation mounted on the pivotable support frame and configured to transport the fibre plants to the self-propelling vehicle, wherein the transport installation comprises a number of guide rollers mounted on the support frame, at least one pair of endless conveyor belts guided along the rollers and at least one drive for driving at least a part of the guide rollers, and wherein the guide rollers and conveyor belts are configured to grip fibre plants therebetween and transport them in gripped state to the self-propelling vehicle, wherein the guide rollers comprise:
    - at least one group of at least two pressing rollers which are configured to press against a first side of a conveyor belt at two or more positions; and
    - at least one support roller which is configured to press against a second, opposite side of the conveyor belt;

wherein the transport installation comprises at least one support member on which the at least one group of at least two pressing rollers is arranged rotatably and wherein the support member is mounted on the support frame rotatably relative to an imaginary rotation point;

the processing unit further comprising a support member retracting mechanism for displacing the at least one support member with the pressing rollers arranged rotatably thereon in axial direction.

In determined embodiments each support member is provided with its own support member retracting mechanism. Each of the support members can then in principle be displaced in axial direction independently of every other support member. In other embodiments the support member retracting mechanism is however configured to simultaneously displace two support members in axial direction, each support member provided with two pressing rollers arranged rotatably thereon.

In an embodiment the processing machine comprises a support member retracting mechanism which is configured to adjust the axial position of the imaginary rotation point of the support member. The support member retracting mechanism can comprise a mounting part which is mounted displaceably on the support frame, wherein the mounting part preferably comprises a plate-like or tubular profile provided with an axial slot, which is arranged around the end frame, and wherein the support frame comprises a mounting pin arranged in the axial slot. The support member retracting mechanism can comprise an actuator for driving the displacement of at least one rotatable support member relative to the support frame.

In an embodiment the two or more pressing rollers of a group are arranged on the support member on either side of the imaginary rotation point.

In an embodiment the imaginary rotation point is situated substantially in the centre of the support member.

In an embodiment the support member is a tumbling element.

In an embodiment the support member has an elongate, optionally curved form, wherein the pressing rollers of a group are arranged on opposite outer ends of the support member.

In an embodiment the support member is rotatable around a rotation point which lies substantially centrally between the outer ends of the support member.

In an embodiment the mounting points of the at least two pressing rollers of a group and the imaginary rotation point of the support member are positioned such that the angle (a) between a first line through the imaginary rotation point and the mounting position of a first pressing roller and a second line through the imaginary rotation point and the mounting position of a second pressing roller lies in the range between 120° and 180°.

In an embodiment the support member is configured to have the second pressing roller located at a second position simultaneously exert a radial opposing force on a conveyor belt when the conveyor belt exerts a radial force on a first pressing roller located at a first position.

In an embodiment the conveyor belts are manufactured from elastic material and/or at least one of the guide rollers is spring-mounted on the support frame. When the support member rotates, for instance in that the first pressing roller is forced to move away from a guide roller lying opposite, it must be possible to have the second pressing roller of the same group of pressing rollers (which is after all mounted on the same rotatable support member as the first pressing roller) displace in corresponding manner.

In an embodiment only the respective front pressing rollers of each pair of endless conveyor belts are mounted on a respective rotatable support member. The possible objects which are too large and/or the crease in the conveyor belts will in many cases have disappeared or have decreased at pressing rollers situated further toward the rear.

In an embodiment a conveyor belt pair comprises a first conveyor belt and a second conveyor belt. The first and second conveyor belt are arranged against each other along a part of the transport path (with the possible fibre plants therebetween).

In an embodiment the transport installation is configured to transport the fibre plants for part of the transport in a state in which they are confined between a guide roller and a conveyor belt, and for another part in a state in which they are confined between the first and second conveyor belt.

In an embodiment the transport installation comprises for each group of pressing rollers a respective opposite guide roller which is situated on the inner side of the conveyor belt pair, making contact with an inner, first side of the conveyor belt. The pressing rollers of the group can be situated on the outer side of the conveyor belt, making contact with an outer, second side of the conveyor belt.

In an embodiment the opposite guide roller is spring-mounted on the support frame, and is preferably coupled to the support frame via only one or more leaf springs.

In an embodiment said at least one support roller is spring-mounted on the support frame of the picking unit or pick-up unit. The support roller is coupled to the support frame via only one or more leaf springs. In determined embodiments the at least one support roller which is situated opposite said at least two pressing rollers of a determined group of pressing rollers is spring-mounted on the support frame.

In an embodiment the processing machine is configured to have the conveyor belt move away with the first pressing roller of the group relative to the support roller by rotation of the support member and to simultaneously have the second pressing roller of the group press further against the conveyor belt by this rotation. When picking up or picking relatively large objects and/or when a crease occurs in the conveyor belt, the risk of the machine jamming can thereby be reduced: this is because a relatively large intermediate space between the support roller on one side and the conveyor belt on the other can be realized by having the first pressing roller pivot away from the support roller. This however does mean that the other pressing roller of the group of at least two pressing rollers is pressed more against the conveyor belt at some distance. In other words, the first pressing roller can be pivoted aside, while a certain pressing force still continues to be continuously exerted by the first pressing roller on the conveyor belt as a result of the presence of the second pressing roller.

In an embodiment the processing machine comprises mounting means for mounting the at least one support member rotatably on the support frame. The mounting means can be configured to adjust the position of the support member and the pressing rollers mounted thereon relative to the position of the conveyor belts. The processing machine can particularly be configured to adjust the height position of the pressing rollers relative to the adjacent conveyor belts.

According to a further aspect, the mounting means of a support member comprises at least two rotation elements which are configured to mount the at least one support member rotatably on the support frame at at least two different height positions.

The mounting means are preferably configured to adjust the position of the support member and the pressing rollers mounted thereon relative to the position of the conveyor belts. The mounting means can particularly be configured to adjust the height position of the pressing rollers relative to the adjacent conveyor belts.

In an embodiment the mounting means comprise:
- a pivot shaft, wherein the pivot shaft is mounted rotatably on the support member at the position of the imaginary rotation point;
- a clamping element mounted on the support frame or formed therewith, for instance a clamping block;
- clamping means, for instance clamping bolts, for clamping the clamping block fixedly onto the pivot shaft at a desired position.

The position of the pressing rollers relative to the conveyor belts can thereby be adjusted.

In an embodiment the support member comprises a substantially L-shaped support plate with a pressing roller at each of the outer ends of the L-shape.

In an embodiment the support member comprises a flange provided on the underside of a support plate. The pivot shaft can be arranged rotatably on both the support plate and the flange.

In an embodiment the processing unit is a picking unit which is configured to pick fibre plants and to transport them to the self-propelling vehicle. In another embodiment the processing unit is a pick-up unit which is configured to pick up previously picked fibre plants from the ground and to transport them to the self-propelling vehicle.

In an embodiment at least one fibre plant conveyor is arranged on the vehicle chassis of the self-propelling vehicle for the purpose of receiving fibre plants from the conveyor belt pair of the processing unit at a first outer end and of transporting at least parts of the fibre plants to an opposite, second outer end, wherein at least one delivering unit provided at or close to the second outer end for delivering and placing on the ground surface the fibre plants coming from the fibre plant conveyor is preferably arranged on the vehicle chassis.

In an embodiment at least the respective front pressing rollers of each pair of endless conveyor belts are mounted on a respective support member.

In an embodiment each conveyor belt pair has a corresponding support element. This means that pressing rollers of different pairs of conveyor belts need not be mounted on the same support element.

In an embodiment the guide rollers comprise at least one drive roller coupled to the drive and configured to drive a conveyor belt. The drive roller can be a support roller, more particularly a support roller situated on the inner side of a conveyor belt. Embodiments wherein a pressing roller is also a drive roller are however also possible.

In an embodiment the drive comprises one or more hydraulic motors which drive one or more of the drive rollers.

The one or more drive rollers can be mounted on a drive roller support which is mounted on the support frame for displacement in axial direction. In determined embodiments the above stated support member retracting mechanism is embodied to displace both one or more support members in a first axial direction and to displace the drive roller support in a second axial direction, opposite to the first axial direction, wherein the support member retracting mechanism is further preferably embodied to have both displacements preferably take place simultaneously.

According to another aspect of the invention, a processing unit of the type described herein is provided. A processing machine without the self-propelling vehicle is thus also provided.

Further advantages, features and details of the invention will be elucidated with reference to the following description of some embodiments thereof. Reference is made in the description to the accompanying figures, in which:

FIGS. 14A-14C are top views of an embodiment of two rotation members with conveyor belts of a processing unit in respectively the starting position, intermediate position and end position when processing a relatively large object or when there is a crease in the conveyor belt;

Figure 1:
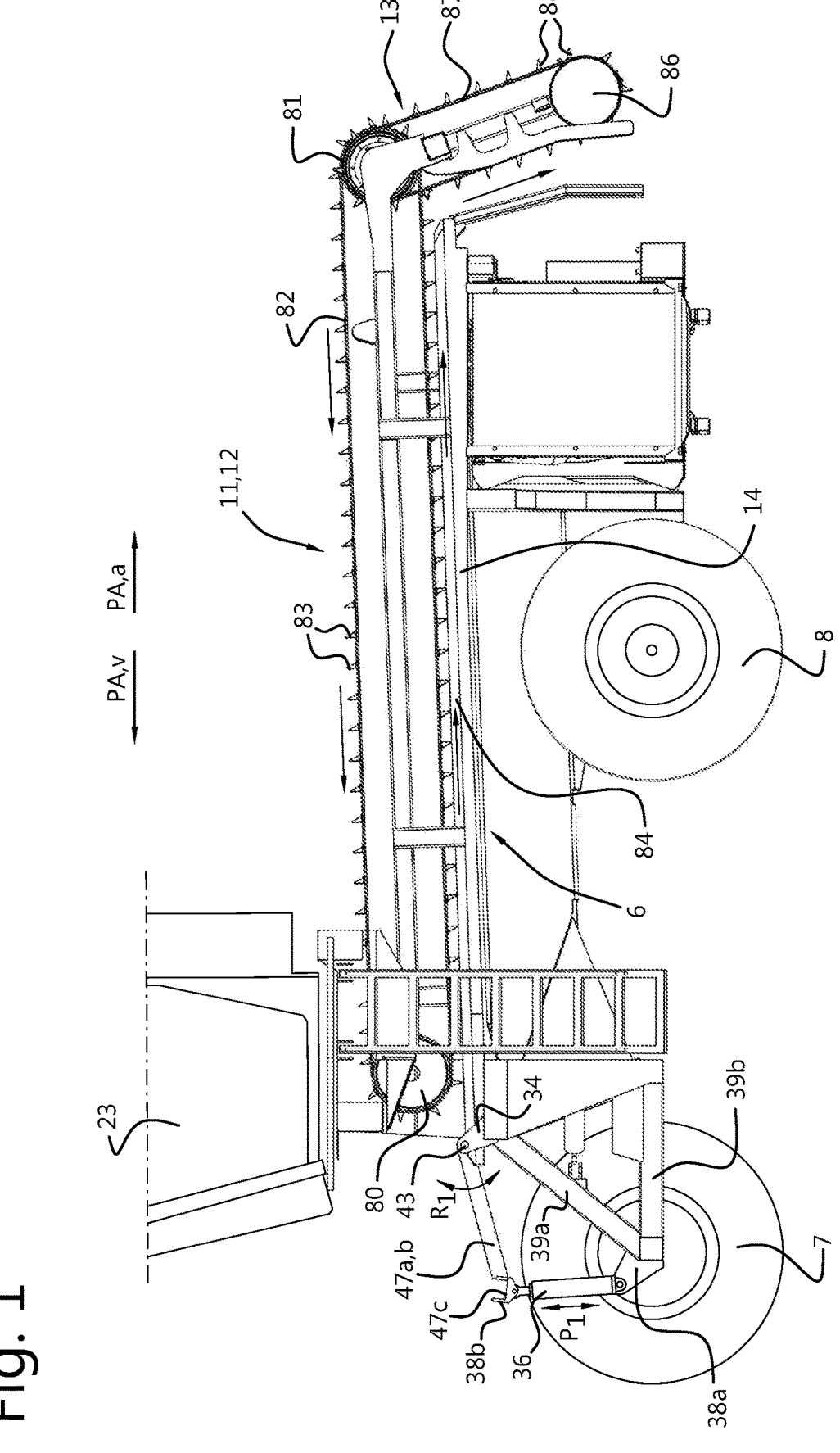
FIG. 1 is a partially cut-away side view of an embodiment of a vehicle according to the invention.

Several examples of embodiments of the invention in which the processing machine is specifically suitable for picking hemp or flax will be given hereinbelow. Such a machine is also referred to as a flax picking machine or hemp picking machine. It will be apparent that the invention also extends to processing machines more suitable for picking up hemp or flax, such as flax or hemp pick-up machines.

When reference is made here to picking fibre plants or picking them up from a ground surface, this can mean that the whole fibre plant is picked or picked up or that one or more parts of the whole fibre plant are picked or picked up.

Flax is a fibre crop which is cultivated for making linen (clothing, home decor), among other things. The flax plant is usually between 80 and 120 cm long, and is harvested using a drawn or self-propelling flax picking machine. Hemp is likewise a fibre crop which is cultivated for making textile fabrics (clothing or home decor), among other things. The hemp plant is a lot longer than the flax plant. The hemp plant is characteristically between 140 cm and 240 cm in length. Hemp is harvested with a hemp picking machine configured specifically for this purpose.

For this purpose the flax picking machine or hemp picking machine has on the front side a picking unit embodied specifically to pull respectively the flax plants or hemp plants from the ground. The harvested fibre plants are then processed by the flax or hemp picking machine by displacing them to the rear side of the flax or hemp picking machine and placing the fibre plants on the ground surface during travel. Hemp plants must still be cut into two or more parts before they are suitable for placing down on the ground. The flax plants/hemp plants are placed flat on the ground in long rows, also referred to as "swathes", wherein the stems of the harvested plants extend substantially transversely of the longitudinal direction of the swathes. This placing back of the flax or hemp flat onto the ground surface so that said swathes are created is also referred to as "depositing" or "picking up". When the flax or hemp plants are placed in rows or swathes, an intermediate space is left between adjacent rows. These spaces are provided in order to prevent the swathes from becoming tangled in each other.

The harvested plants which were placed flat on the ground in swathes are then retted under the influence of a combination of dew, rain and sunlight. The retting of the flax or the hemp by leaving them on the ground (i.e. a field or retting field) for some time is referred to in the field of processing flax as field retting or dew retting. In order to obtain a uniform retting and to prevent rotting of the flax or the hemp, the fibre plants placed flat on the ground in rows must be flipped over regularly. This flipping over of the flax or hemp placed flat on the ground is also referred to as "turning". The turning of the flax is performed using a drawn or self-propelling flax turning machine, while the turning of the hemp is performed using a drawn or self-propelled hemp turning machine. In determined embodiments of the present invention the flax turning machine and the hemp turning machine are combined into one single machine, which can thus process both hemp and flax. According to determined embodiments of the invention, the flax and hemp turning machines are further also constructed as respective flax and hemp picking machines, and in yet another embodiment the machine is or can be made suitable for at least picking flax, picking hemp, turning flax and turning hemp.

Figure 2:
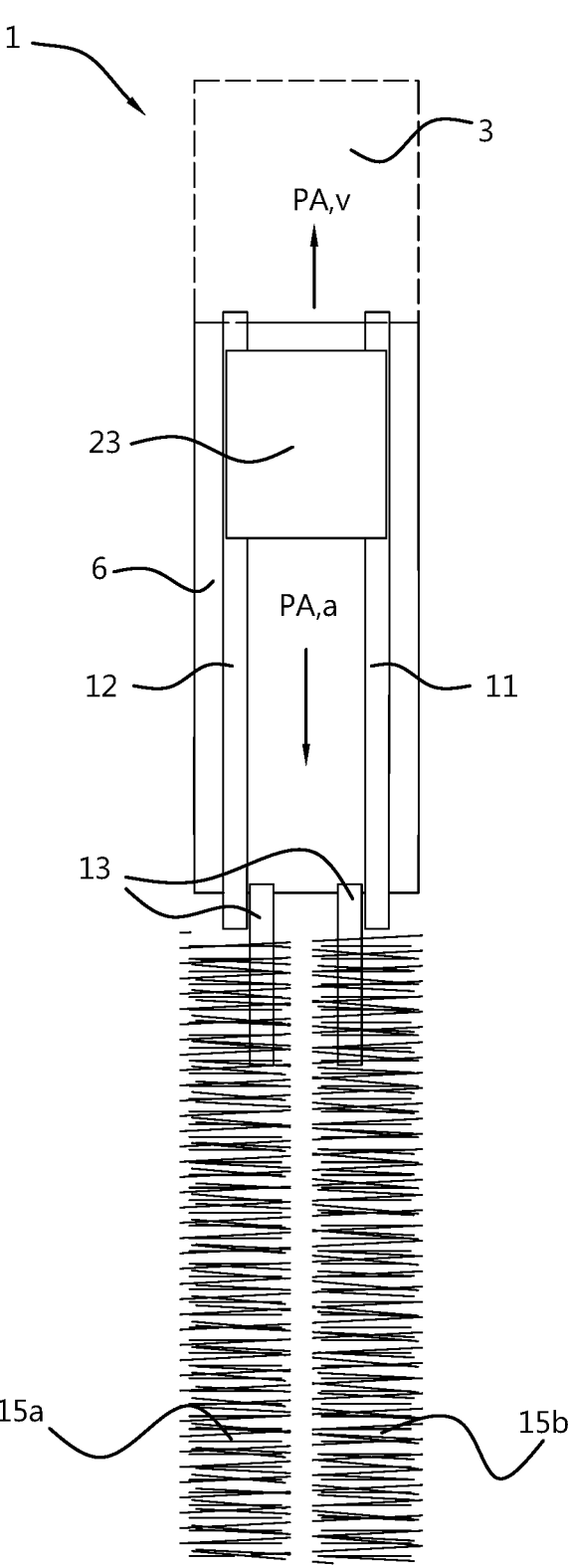
FIG. 2 is a schematic top view of the vehicle of FIG. 1, provided on the front side with a picking unit according to the invention.
Figure 3:
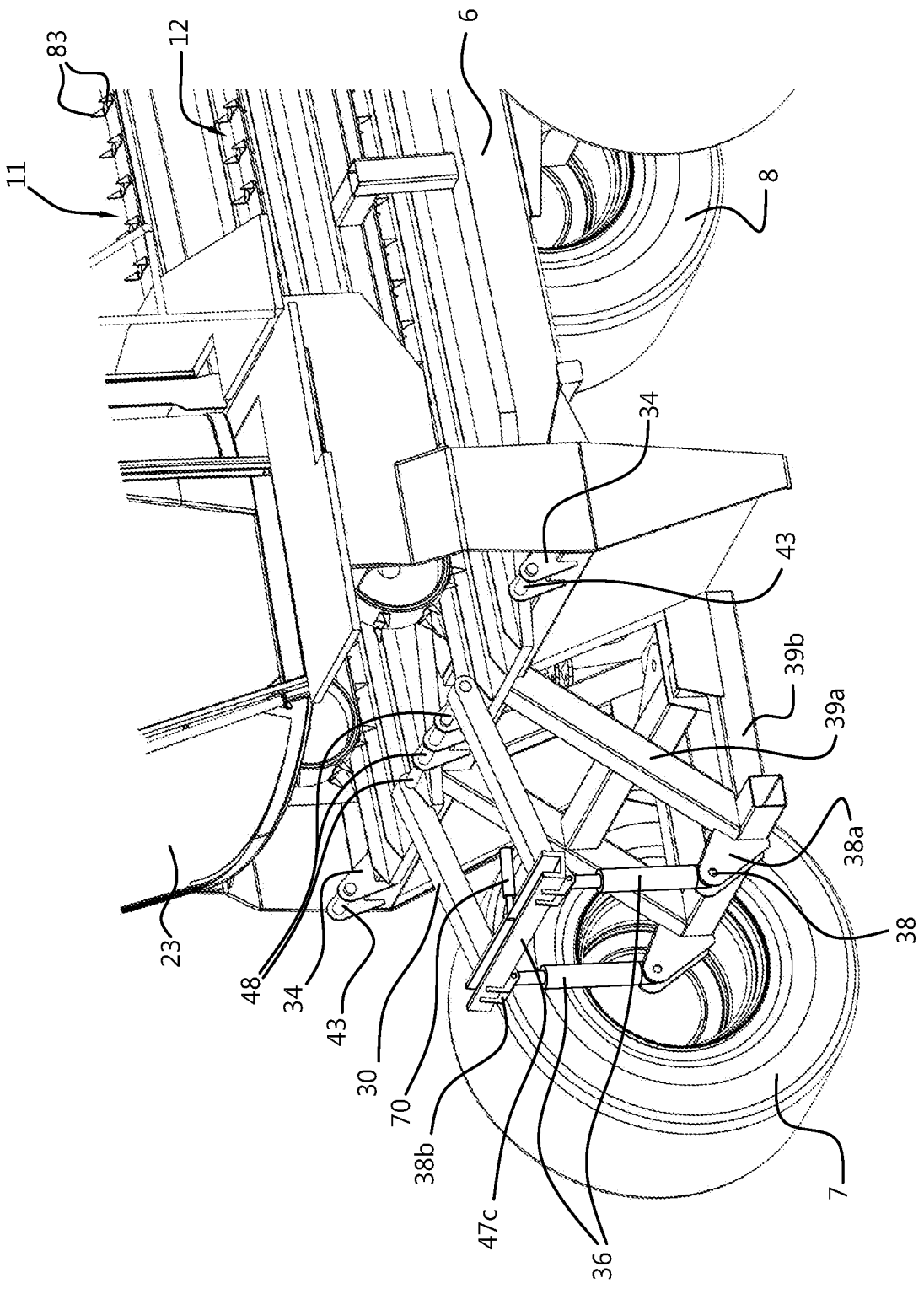
FIG. 3 is a partially cut-away perspective side view of the embodiment of the vehicle according to FIGS. 1 and 2.

FIGS. 1-3 show a self-propelling vehicle 2 of a processing machine 1 according to a determined embodiment of the invention. Self-propelling vehicle 2 comprises a vehicle chassis 6 on which four wheels, i.e. two front wheels 7 and two rear wheels 8, are arranged in known manner. In FIG. 1 a part of the front left side of the vehicle has been cut away (i.e. the front left wheel and the relevant part of the wheel suspension) in order to obtain a better view of the construction of the vehicle on the front side. The vehicle is self-propelling, which means that it is provided with its own drive motor whereby a number of the wheels, for instance the two rear wheels, or all the wheels can be driven. The self-propelling vehicle 2 is preferably driven by a number of hydraulic motors, one for each wheel 7, 8, which hydraulic motors are connected to a hydraulic pump unit which is configured to provide a hydraulic medium under pressure via a hydraulic circuit provided in the vehicle. The hydraulic pump unit is driven by a combustion engine, for instance a diesel engine. The combustion engine and hydraulic pump unit together are designated in FIG. 4 in schematic manner with reference numeral 9.

The vehicle is steered from a driver's cab 23 on the front side of the vehicle. Chassis 6 comprises two parallel conveyors 11, 12 formed by a loading floor or platform 14 and two endless conveyor belts provided thereabove. At least one of the endless conveyor belts can here be adjusted in lateral direction so that the intermediate distance between the two conveyor belts can be adjusted, this in order to realize a suitable intermediate distance for shorter or longer swathes.

Referring to the top view of FIG. 2, the two conveyors 11, 12 are arranged along both longitudinal edges of vehicle 2 so that a quantity of fibre plants can be transported in axial rearward direction ($P_{A,a}$) with each of these. In the shown embodiment each of the conveyors 11, 12 comprises an endless conveyor belt 82 which runs on a front roller 80 and a rear roller 81. At least one of the rollers 80, 81 is driven via a drive (not shown). In a determined embodiment the drive comprises a hydraulic motor arranged in the rear (triple) pulley or roller 81. Each of the respective part-rollers of the multiple (triple) pulley is driven separately yet synchronously to each other, preferably according to a determined ratio as desired. So-called carriers 83 are provided on the outer side of conveyor belt 82. These can displace the fibre plants lying on platform 14, at least on guide rails 84 of the platform (FIG. 1), in said axial rearward direction ($P_{A,a}$) to the rear side of chassis 6. The fibre plants are thus enclosed here between conveyor belt 82 and guide rails 84.

On the rear side of vehicle 2 a delivering unit 13 is arranged for each conveyor 11, 12. In the shown embodiment the delivering unit 13 comprises an endless belt conveyor 87. The endless belt of each of the endless belt conveyors 87 is trained around a roller 86 and around said roller 81 (a belt conveyor 87 therefore sharing this with a conveyor 11 or 12). Driving of delivering unit 13 takes place the first roller 81. This extends obliquely rearward to some extent and is configured to displace the fibre plants coming from respective conveyor 11, 12 downward in dosed and controlled manner so that the fibre plants can be placed on the ground on the rear side of the vehicle. As shown in FIG. 2, when the vehicle moves in an axial forward direction ($P_{A,v}$), the fibre plants (v) picked or picked up on the front side of the vehicle will be displaced to the rear side of vehicle 2 and will each be placed down on the ground (o) in a separate row 15a, 15b via delivering units 13. In determined applications the rows 15a, 15b of fibre plants are composed of the same parts of the fibre plant, for instance in the case of the relatively short flax plants. In other embodiments the one row is however composed of the lower portions of the harvested fibre plants, while the other row consists of the upper portions of the harvested fibre plants. This is for instance the case when hemp plants are harvested. In both cases the fibre plants are placed flat on the ground, parallel to each other as far as possible, after which said retting can commence.

Vehicle 2 is provided with a picking unit 3 on its front side in order to be able to pick the fibre plants. This can be a first picking unit developed especially for picking long fibre plants (such as hemp) (also referred to herein as a hemp picking unit), or a second picking unit developed especially for picking short fibre plants (such as flax) (also referred to herein as a flax picking unit). Depending on the length of the crop to be picked, a different picking unit must thus be mounted on the vehicle. Different examples of a picking unit for picking relatively long fibre plants are shown in FIGS. 4-7.

Referring to FIGS. 1 and 3 in particular, the chassis comprises on the front side of chassis 6 of vehicle 2 a number of support chassis parts 39a, 39b. The support chassis parts 39b extend in line with the rest of chassis 6 of vehicle 2, while the support parts 39a mounted on support parts 30b and the rest of chassis 6 are disposed obliquely. Chassis 6 is further provided with a number of hinges 48 on which two parallel longitudinal lifting arms 47a, 47b are arranged. Both longitudinal lifting arms 47a, 47b are connected at their outer ends to a transverse lifting arm 47c. The support chassis parts 39a, 39b, longitudinal lifting arms 47a, 47b and transverse lifting arm 47c together form a strong and stable support structure for mounting a number of actuators whereby a picking unit 3 coupled to the chassis 6 of vehicle 2 can be pivoted upward and downward. Together with these actuators the support structure forms the above stated lifting unit.

The pivoting of picking unit 3 is brought about by a number of actuators, for instance electric actuators (motors) or, preferably, lifting cylinders 36, of the lifting unit (FIG. 3). In FIGS. 1 and 3 the actuators are formed by two lifting cylinders 36. In the shown embodiment two lifting cylinders positioned laterally adjacently of each other are provided. In other embodiments use is however only made of a single lifting cylinder, or three or more lifting cylinders are applied. The lifting cylinders are mounted pivotally on the support chassis parts 39_a_, 39_b_ via hinges 38 and on transverse lifting arm 47_c_ via a mounting support 38_b_. A further description of the construction of the lifting unit and of the operation thereof will follow below.

Further referring to FIG. 3, chassis 6 is provided on either side of the support chassis parts 39_a_, 39_b_ with first mounting means 34 for mounting a picking unit 3 thereon in pivotable and releasable manner. The first mounting means 34 can be embodied in numerous ways, but in the shown specific embodiment comprise a number of flanges in which respective pivot shafts 43 can be rotatably mounted.

Each of the different picking units 3 comprises one or more frame parts of a support frame, which can be mounted in pivotable and releasable manner on said first mounting means 34. In the embodiments shown in FIGS. 4, 5 and 6 the picking unit 3 comprises a first, lower hemp picking element 25 and a second, upper hemp picking element 26 placed thereabove. The lower hemp picking element comprises a frame part 30 which can be mounted pivotally and in easily releasable manner on first mounting means 34 of the vehicle using second mounting means 32. The upper hemp picking element 26 comprises a frame part 33 which also takes a pivotable (yet not necessarily easily releasable) form, albeit that in the shown embodiment frame part 33 of the upper hemp picking element 26 is mounted on the frame part 30 of the lower hemp picking element 25 instead of directly on chassis 6 of the vehicle. In other embodiments (not shown) it is however precisely the upper hemp picking element that is mounted on chassis 6 of vehicle 2, and the lower hemp picking element on the upper hemp picking element. In still further embodiments (not shown) the two hemp picking elements are mounted pivotally and releasably on vehicle 2. In yet other embodiments only one picking element is provided, wherein this one picking element is configured to pick shorter hemp plants, such as flax. The flax picking element can in principle have a similar construction as one of the two hemp picking elements 25, 26, and in determined embodiments the flax picking element is even almost identical or wholly identical to a hemp picking element.

For mounting on the chassis 6 of vehicle 2, more particularly on the first mounting means 34 thereof, such as the flanges 34 positioned on or close to the sides of vehicle 2 and having the pivot shafts 43 mounted therein, the picking unit 3, in the shown embodiment the lower hemp picking element 25, is provided with second mounting means 32. The second mounting means 32 are embodied for easy mounting on first mounting means 34. The first and second mounting means 34, 32 together form a mounting hinge between picking unit 3 and vehicle 2, such that picking unit 3 can be pivoted in upward and downward direction around the lying pivot shafts 43.

To make picking unit 3 pivot relative to vehicle 2 the above described lifting unit is utilized. As described above, the lifting cylinders 36 are arranged rotatably on the flanges 38_a_ of chassis 6 at one outer end. On their opposite sides the lifting cylinders 36 are coupled via mounting supports 38_b_ to the transverse lifting arm 47_c_. Transverse lifting arm 47_c_ of the lifting unit has a substantially U-shaped cross-section, which is clearly visible particularly in FIGS. 1 and 3. The U-shape forms a receiving space for a part of the frame part 30 of the lower hemp picking element 25. In other words, the picking unit 3 can be connected to the lifting unit in simple manner by placing frame part 30 of lower hemp picking element 25 into the transverse lifting arm 47_c_ of the lifting unit from above or, conversely, by simply pressing transverse lifting arm 47_c_ against frame part 30 from below. Finally, the whole is locked by a locking mechanism 70 (FIG. 3), for instance in the form of a remotely controllable extending cylinder which in extended state ensures that picking unit 3 remains locked to the lifting unit. The lifting unit is then ready to lift picking unit 3.

Figure 7:
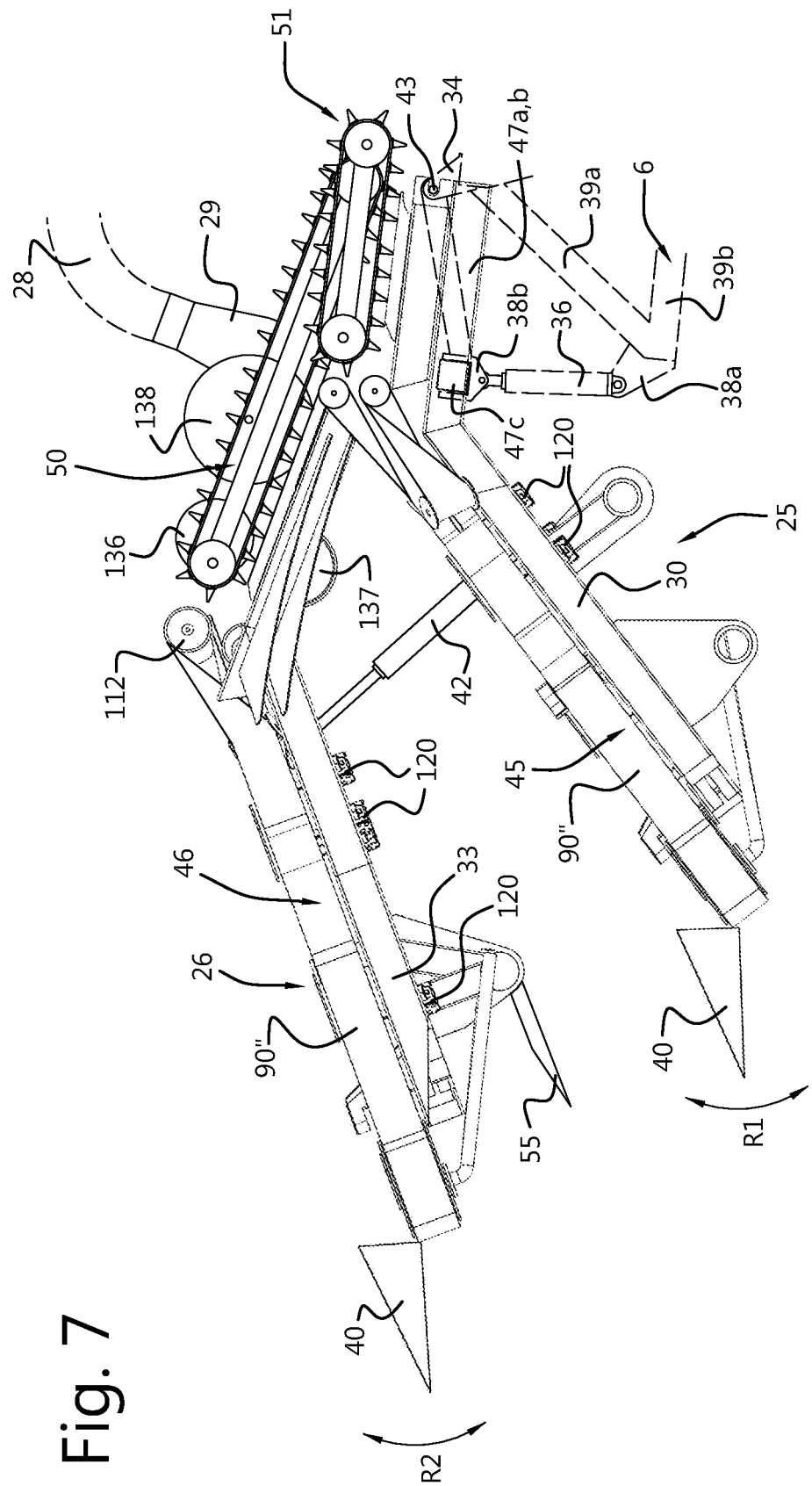
FIG. 7 is a perspective side view of a processing machine provided with a picking unit with two picking elements according to the embodiment of FIG. 5 or of FIGS. 6A and 6B.

As shown in FIG. 7 with arrows ($P_1$, $P_2$), the length of each of the lifting cylinders 36 and 42 is controllable. It will be apparent that when the length of lifting cylinders 36 and/or 42 is increased, frame part 30 and frame part 33 will respectively pivot upward, while the relevant frame part 30, 33 will pivot downward if the length of lifting cylinders is reduced. In this way the height of the free outer end of the picking unit can be varied, for instance in order to adjust the position in which the picking unit grips the fibre plants and pulls them from the ground during travel of the vehicle.

FIGS. 4, 5, 6A, 6B and 7 show different embodiments of a processing machine 1 according to the invention wherein the processing machine is provided with an exchangeable picking unit comprising a first picking element and a second picking element placed thereabove. This embodiment is embodied for picking relatively long fibre plants, such as hemp plants, as shown schematically in the figure. In the shown embodiment the processing machine 1 comprises the above stated self-propelling vehicle 2 and a specific picking unit 3, i.e. a hemp picking unit. The hemp picking unit comprises a lower hemp picking element 25 and arranged thereabove an upper hemp picking element 26. The lower picking element 25 is mounted on the first mounting means of the vehicle in the above stated manner, this such that the first hemp picking element 25 can be pivoted in upward and downward directions (pivoting directions $R_1$, FIG. 7) by controlling one or more of said lifting cylinders 36. The upper hemp picking element 26 is pivotally arranged via pivot shafts 43 on the lower hemp picking element 25 so that the upper hemp picking element 26 can be pivoted (pivoting directions $R_2$) relative to the first hemp picking element 25 (and relative to vehicle 2 and the ground surface). The pivoting movement of the upper hemp picking element 26 relative to the lower hemp picking element 25 is driven by a number of further lifting cylinders 42 arranged on frame parts 30, 33, wherein increasing the length of lifting cylinders 42 results in an upward rotation of the upper hemp picking element 26 relative to the lower hemp picking element 25, while reducing the length results in a downward rotation of the upper hemp picking element 26 relative to the lower hemp picking element 25.

Figure 4:
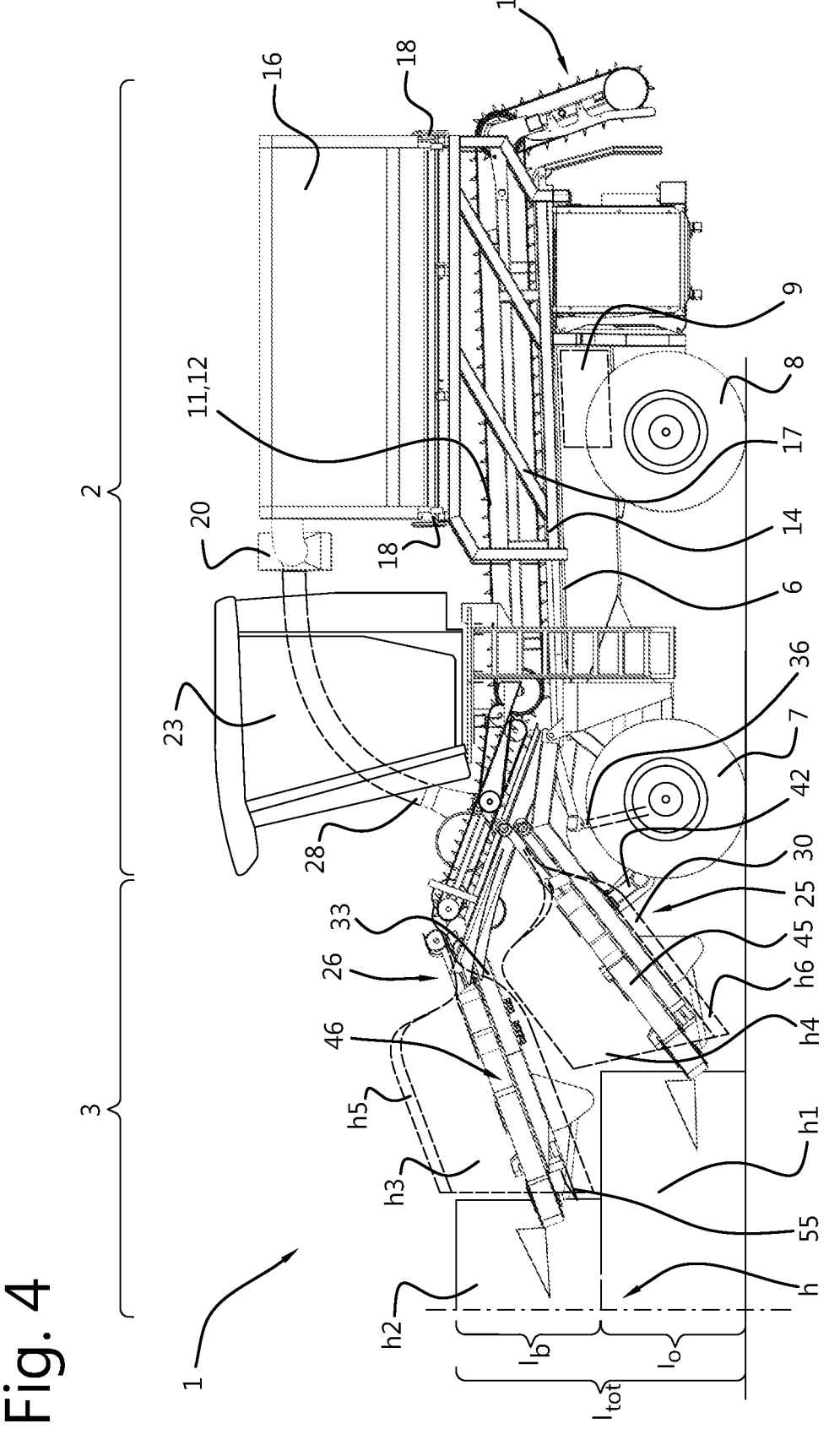
FIG. 4 is a side view of a machine according to an embodiment of the invention, wherein a picking unit 3 according to the invention is mounted on vehicle 1 and is suitable for processing of long fibre plants such as hemp.

FIG. 4 shows schematically that the relatively long fibre plants (h), such as hemp, kenaf, jute or similar fibre plants, have an overall length $l_{tot}$ (characteristically between 1.4 and 4.0 metres, 2.4 metres on average). The lower part ($h_1$) of each of the fibre plants (h) has a length $l_o$ (for instance 110 cm to 120 cm), while the upper part ($h_2$) has a length $l_b$ (for instance 120 to 130 cm). In the shown embodiment both lengths $l_o$ and $l_b$ are roughly the same, although in practice these lengths may of course differ. What is important is only that the fibre plants (h) are cut into at least two parts ($h_1$, $h_2$)

and then processed further by processing machine 1. Said lower hemp picking element 25 is for this purpose made suitable for picking and processing the lower fibre plant parts ($h_1$), while the upper hemp picking element 26 is intended for picking the upper fibre plant parts ($h_2$).

The upper hemp picking element 26 comprises a transport installation 46 for gripping hemp plants and transporting them to vehicle 2, while the lower hemp picking element 25 comprises a (preferably wholly or almost wholly identical) transport installation 45 whereby hemp plants can likewise be gripped and transported to vehicle 2. When vehicle 2 travels in a forward direction ($P_{A,v}$), the upper hemp picking element 26 will reach the hemp plants first. After a short time interval the lower hemp picking element 25 will also reach these same hemp plants. In other words, the engaging position at which the upper hemp picking element 26 engages a determined hemp plant at a determined point in time is shifted relative to the engaging position at which the lower hemp picking element 25 engages a (different) fibre plant at the same point in time. This has the result that the upper hemp picking element 26 first engages the upper part ($h_2$) of the hemp plants and cuts them loose from the lower part ($h_1$) with a cutting element 55 (also referred to here as mowing element 55) provided on the front side of the upper hemp picking element 26, while it is after this, so only when upper part $h_2$ has been cut loose and is already being carried away, that the lower hemp picking element 25 will engage on the lower part ($h_1$) of the same hemp plant.

The lower hemp picking element 25 is configured to engage the lower part ($h_1$) of the hemp plant. As a result of the forward movement of vehicle 2 and/or as a result of displacement by means of the transport installation 45 to be described further below the hemp plants are pulled from the ground along with the roots.

As shown in FIG. 4, the gripped upper part ($h_2$) of a hemp plant (h) which has been cut loose with mowing element 55 is picked up by the upper hemp picking element 26. This upper part ($h_2$) of the fibre plant comprises a top, flower or plume portion ($h_5$) and a remaining upper portion ($h_3$). The top portion ($h_5$) of the upper part ($h_2$) of the hemp plant (h) can be removed using a cutting unit 138. The top portion ($h_5$) is here discharged via discharge means comprising a discharge pipe 28 with an inlet opening close to the cutting unit, a centrifugal fan 20 connected to the discharge pipe and an outlet opening to a receptacle 16 arranged via a frame 17 on the rear side of vehicle 2.

As further elucidated elsewhere, in determined embodiments the two delivering units 13 are configured to place a first row 15a of only lower remaining parts ($h_4$) of the hemp plant and a second row 15b of only upper remaining parts ($h_3$) of the hemp plants (h) onto the ground and then have them undergo the desired retting process (FIG. 2).

Figure 5:
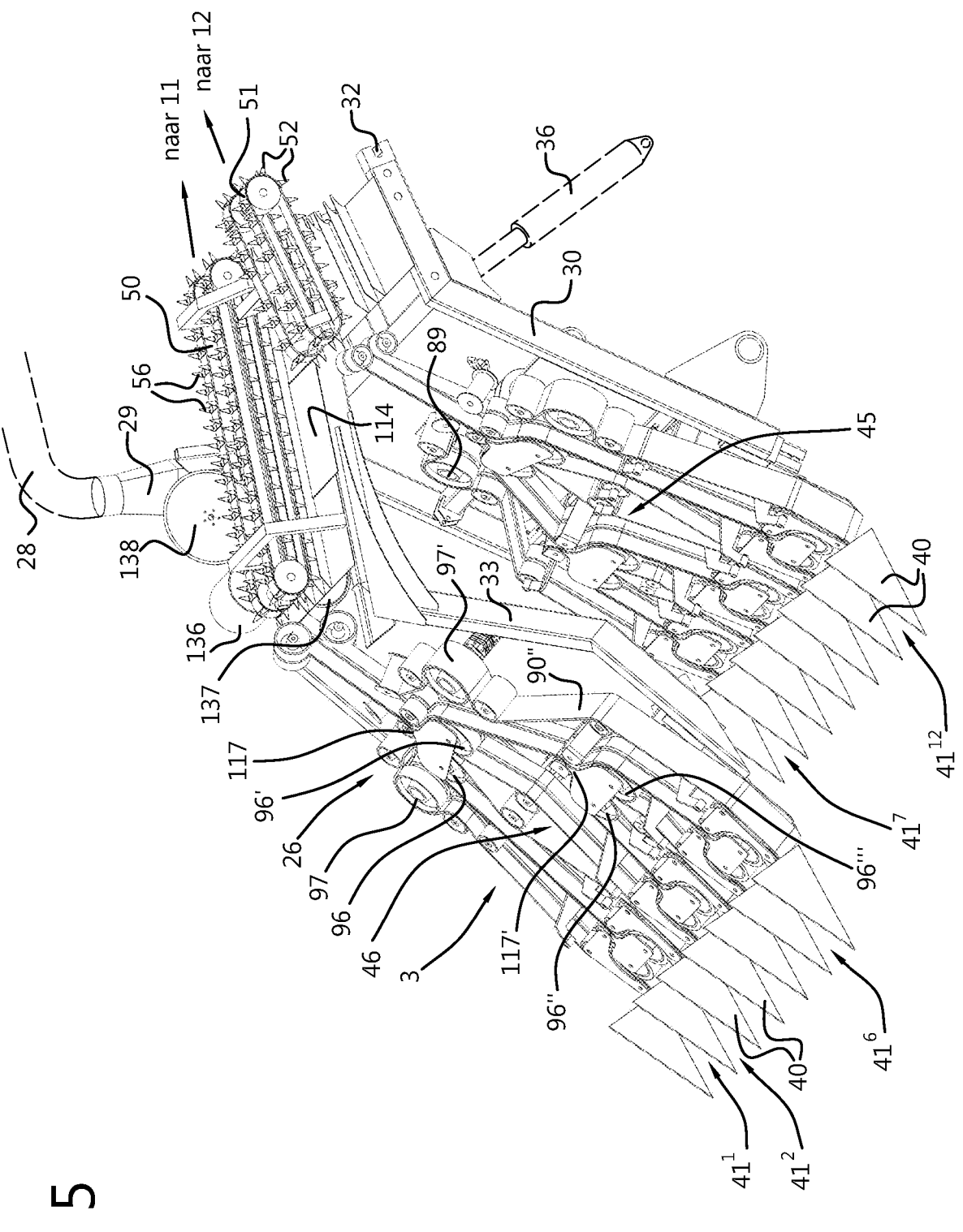
FIG. 5 is a detail view of an embodiment of a picking unit 3 according to the invention.
Figure 6A:
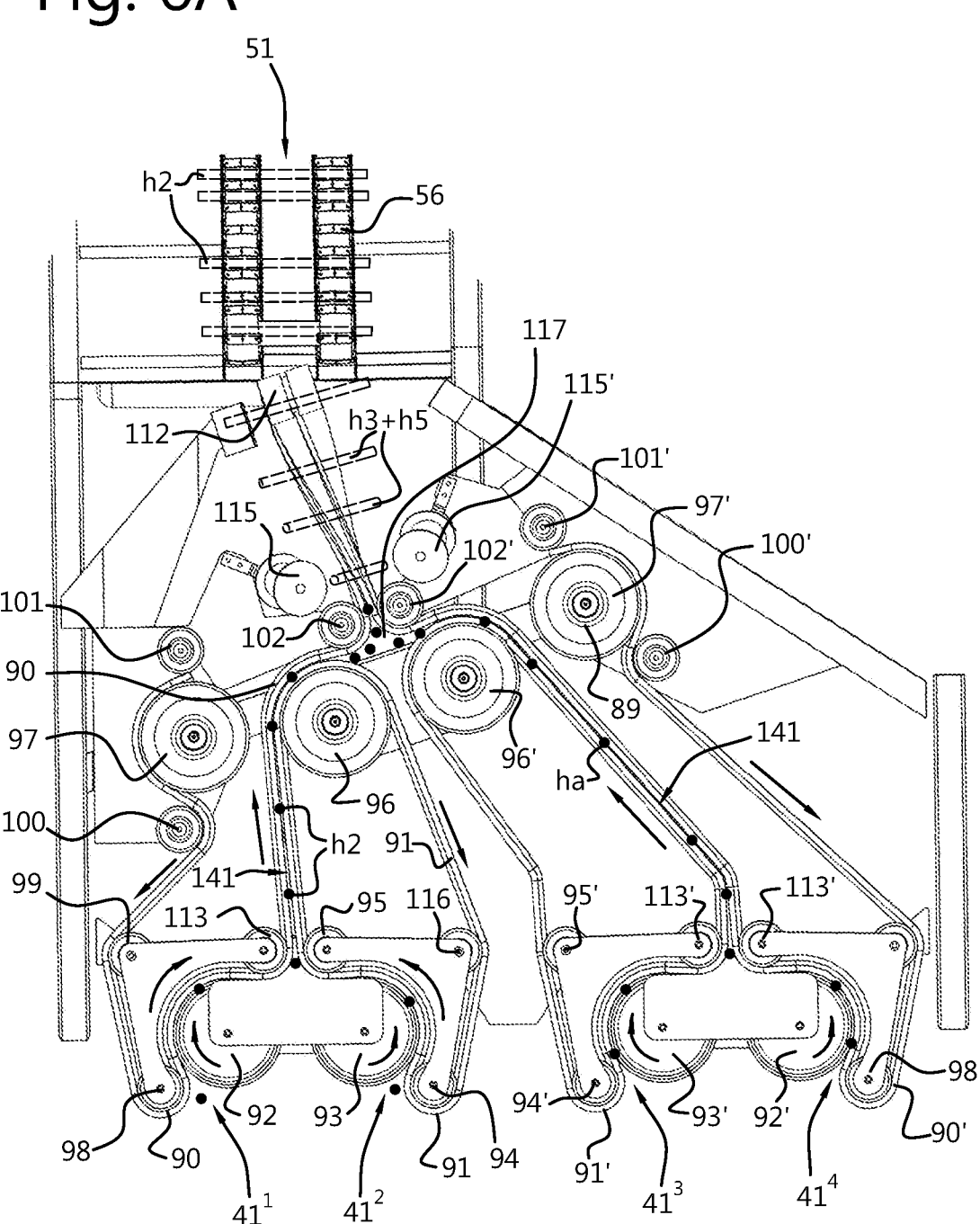
FIGS. 6A and 6B are a top view and a side view of an alternative embodiment of a picking element of a picking unit according to the invention.
Figure 6B:
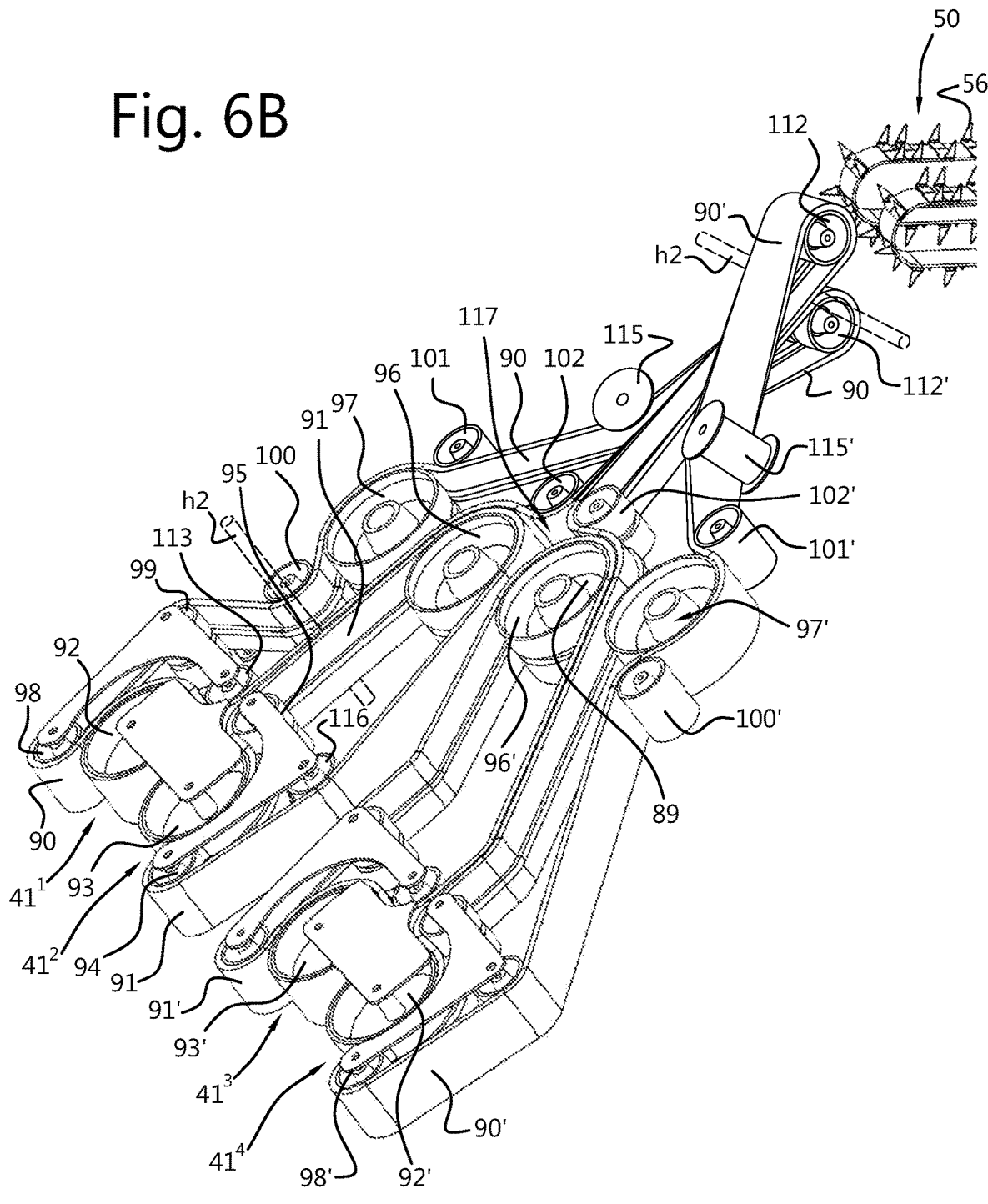

FIGS. 4 and 5 show a side view of a first embodiment of the hemp picking unit 3, while FIGS. 6A and 6B show views of the lower picking element of a second embodiment of the hemp picking unit and FIG. 7 shows a side view of this embodiment. FIGS. 4, 5 and 7 show the transport installations 45, 46 whereby the hemp plants are gripped and transported to vehicle 2. Each of the transport installations 45, 46 comprises a number of endless belt conveyors, more particularly a first number of endless belt conveyors for gripping the crop, transporting it and tilting the crop during transport, and a second number of endless belt conveyors for receiving the crop from the first number of belt conveyors and transporting the crop to the conveyors on vehicle 2. The second number of conveyors (characteristically 3, 4 or more) is here usually smaller than the first number of conveyors (characteristically 1 or 2).

Guide elements 40 are provided on the front side of both the lower hemp picking element 25 and the upper hemp picking element 26. Their object is to make it possible to be able, when the vehicle and the picking unit 3 mounted thereon are advanced, to push the hemp plants (h) to the side and guide them into a number of, in FIG. 5 six per hemp picking unit (although this can also be a greater or smaller number in other embodiments), passages $41^1$-$41^6$ for the upper hemp picking element 26 and passages $41^7$-$41^{12}$ for the lower hemp picking element 25, all configured to receive and grip the hemp plants. These twelve passages are formed by a number of driven conveyor belts and a number of guide rollers. The guide rollers can perform one or more different functions. A guide roller can for instance be a support roller for supporting a conveyor belt, be a drive roller for driving a conveyor belt, and/or be a pressing roller for locally providing a pressing force against a conveyor belt. This latter will be further elucidated in the following.

For further details of the embodiment shown in FIG. 5 and the operation thereof reference is made to the embodiment to be described below and shown in FIGS. 6A and 6B. FIGS. 6A and 6B show an alternative embodiment with only four passages for throughfeed of the plants. The figures show a first passage $41^1$ which is formed by the intermediate space between a first driven conveyor belt 90 and support roller 92, 93. A second passage $41^2$ is formed by a second driven conveyor belt 91 and support roller 93. Likewise, the third passage 41' and fourth passage $41^4$ are formed by respectively conveyor belt 91' and support roller 93', and conveyor belt 90' and support roller 92'.

When hemp plants (h, shown in FIG. 6A with black dots in as far as the hemp plants are in upright position and shown with broken lines as soon as the hemp plants have been rotated to the lying position) have found their way into the first passage $41^1$ formed between the first driven conveyor belt 90 and the support roller 92, 93, they are pulled along in the direction indicated by the arrow. Along the first section the hemp plants which have found their way into passage $41^1$ are enclosed between the first conveyor belt 90 and the support roller 92, 93 and transported thereby, further along the hemp plants come to lie between first conveyor belt 90 and second conveyor belt 91. The second conveyor belt 91 is a relatively short conveyor belt and extends in upward direction over its whole length. The second conveyor belt 91 is trained around said support roller 93, a number of further pressing rollers 94, 95 and 116 and a driven drive pulley or drive roller 96. The third conveyor belt 91' of the third passage $41^3$ has essentially the same construction as the second conveyor belt 91, except in mirror image and driven by a drive pulley or drive roller 96'.

The first conveyor belt 90 is a lot longer than the second conveyor belt 91 and extends over a part of its length in upright state, but along a different part of its length the position of the conveyor belt is rotated from the upright position to a lying position, and further along from a lying position back to an upright position. The first conveyor belt 90 is trained around said support roller 92, 93, a number of further pressing rollers 98, 113, 102, 112, 115, 101, 100, 99 and 98 and a further support roller 97 (support 97 is driven and also referred to here as a drive roller). The fourth conveyor belt 90' of the fourth passage $41^4$ has essentially the same construction as first conveyor belt 90, except in mirror image, and is driven by a drive pulley or drive roller 97' and trained over support rollers 93', 92', 113', 96' (via third conveyor belt 91'), 102', 112', 115', 101', (driven) 97', 100', 99' and 98'.

As elucidated above, in the embodiment of FIG. 5 a larger number of passages is formed per frame part 30, 33 than in the embodiment of FIGS. 6A and 6B. In order to realize this greater number and still realize the overall width of frame part 30 of picking element 25 and/or frame part 33 of the upper hemp picking element 26, two further drive pulleys 96", 96''' are arranged at a number of positions axially displaced relative to those of the above described drive pulleys or rollers 96, 96', 97, 97'. These further drive pulleys have a similar operation as the above stated drive pulleys 96, 96'. Just as the above stated drive pulleys 96 and 96', the further drive pulleys 96" and 96''' are in determined embodiments moreover mounted on the respective frame part 30 and 33 for displacement in axial direction.

Figure 8:
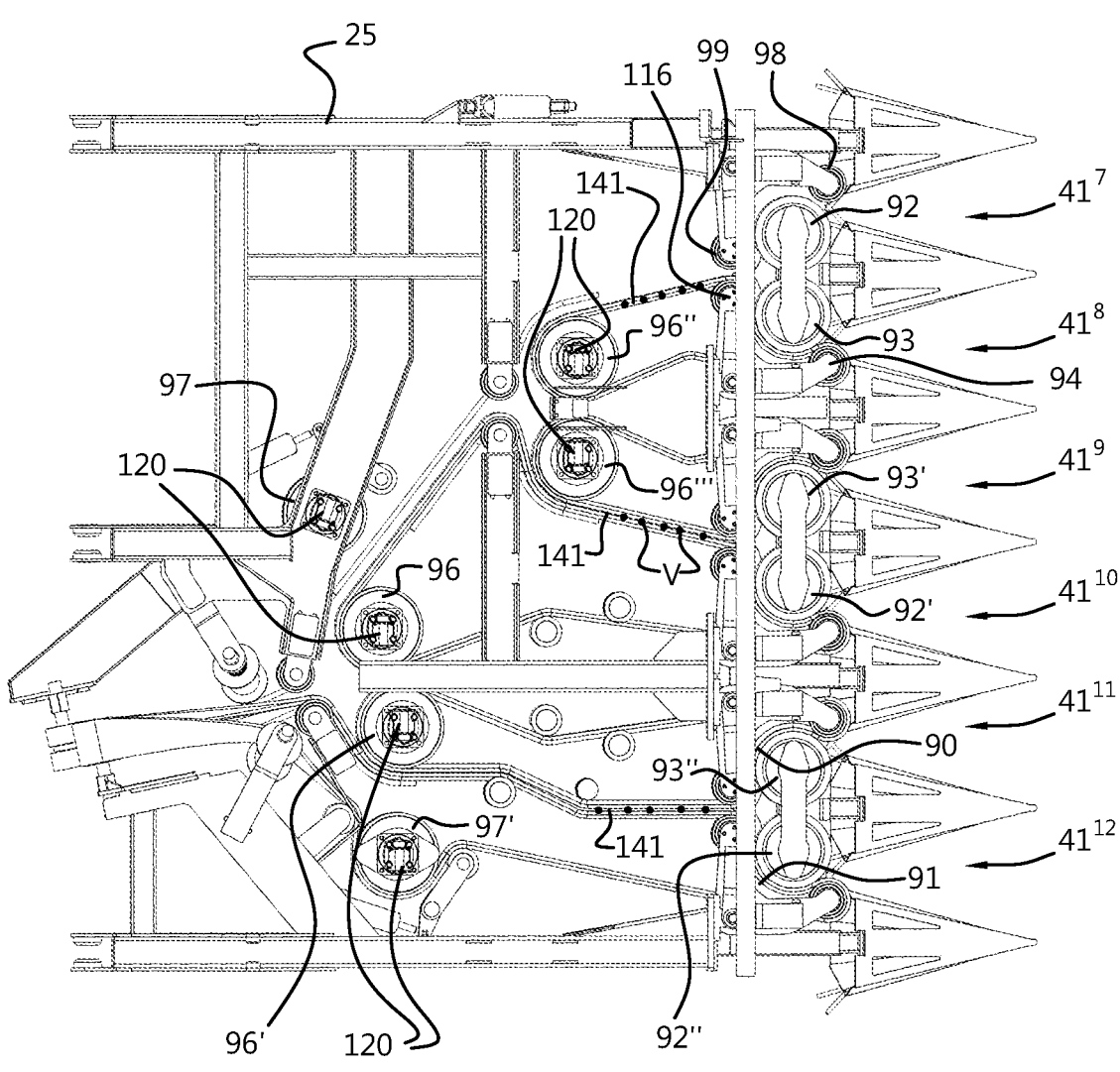
FIG. 8 is a bottom view of a preferred embodiment of a lower picking element 25 corresponding to the processing machine of FIG. 5.
Figure 9:
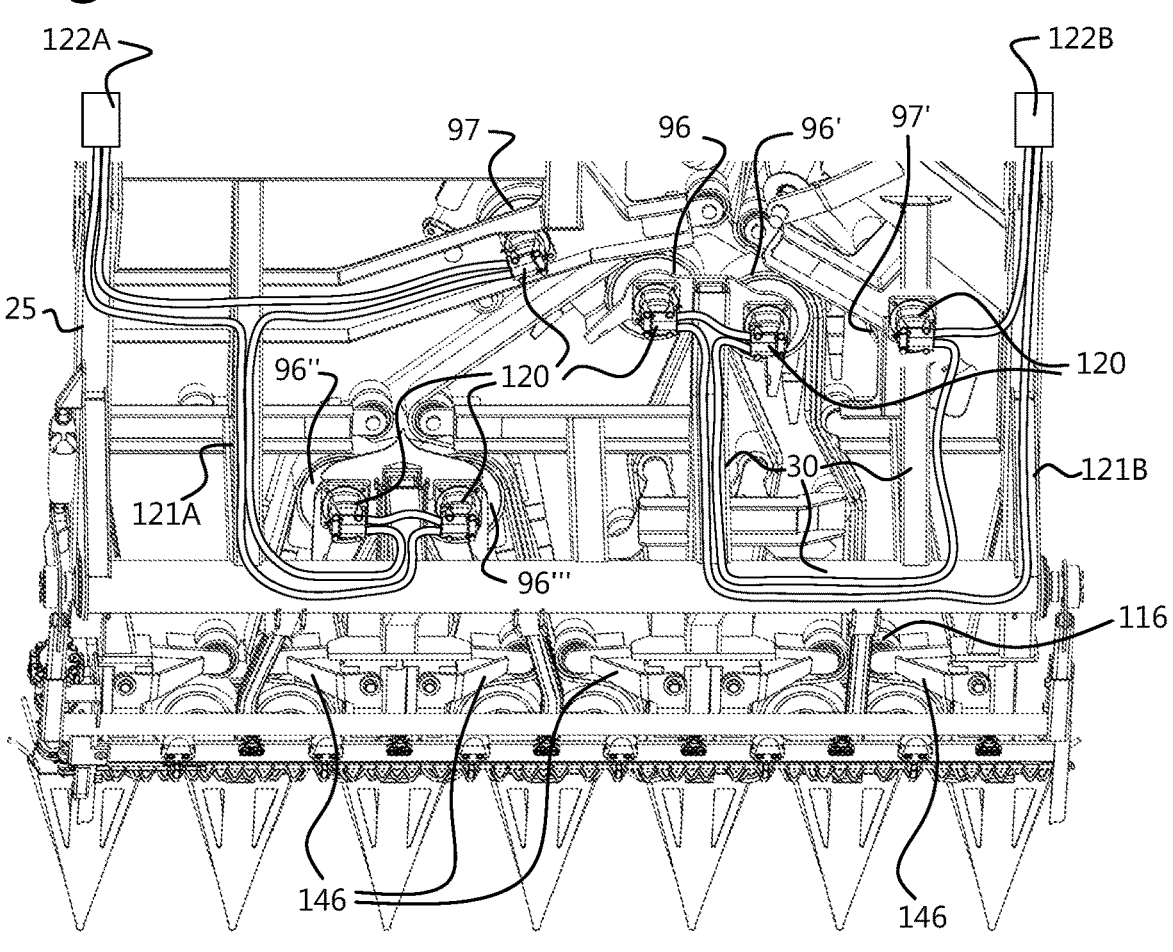
FIG. 9 is a view at an angle from below of the lower picking element 25 according to the embodiment of FIG. 5.
Figure 10:
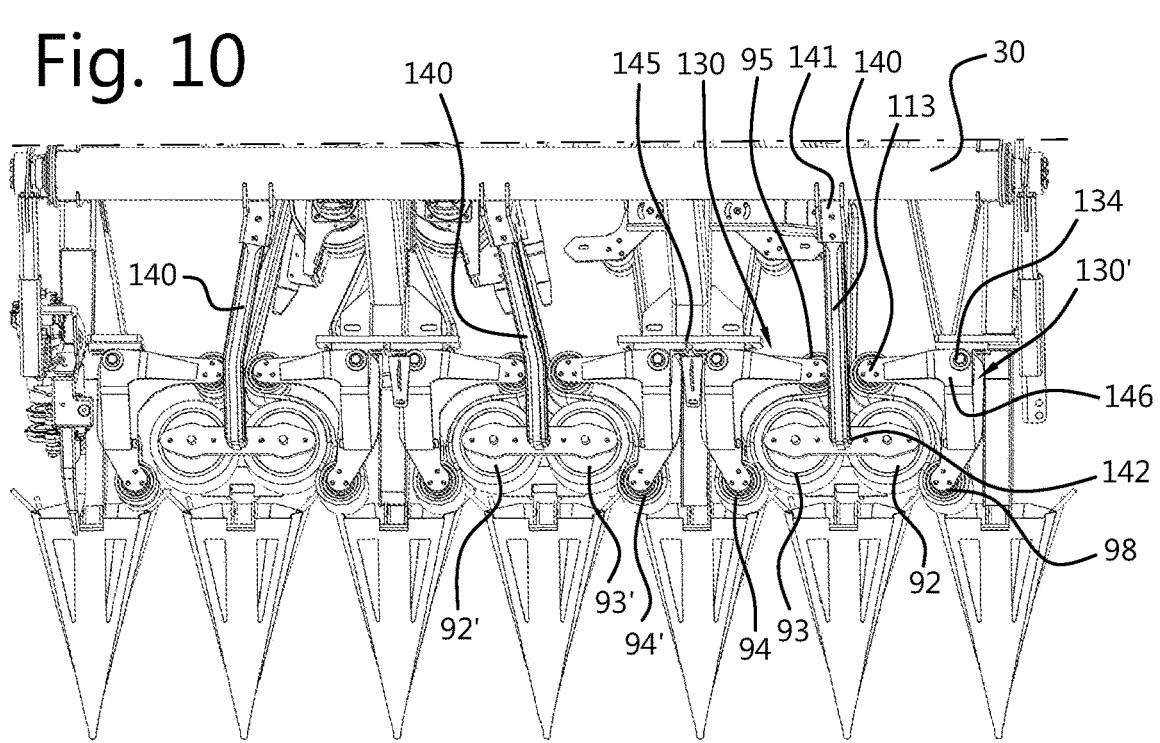
FIG. 10 is a view corresponding to FIG. 9 in which some components of the processing machine have been cut away for a better view of the processing unit according to an embodiment of the invention.
Figure 11:
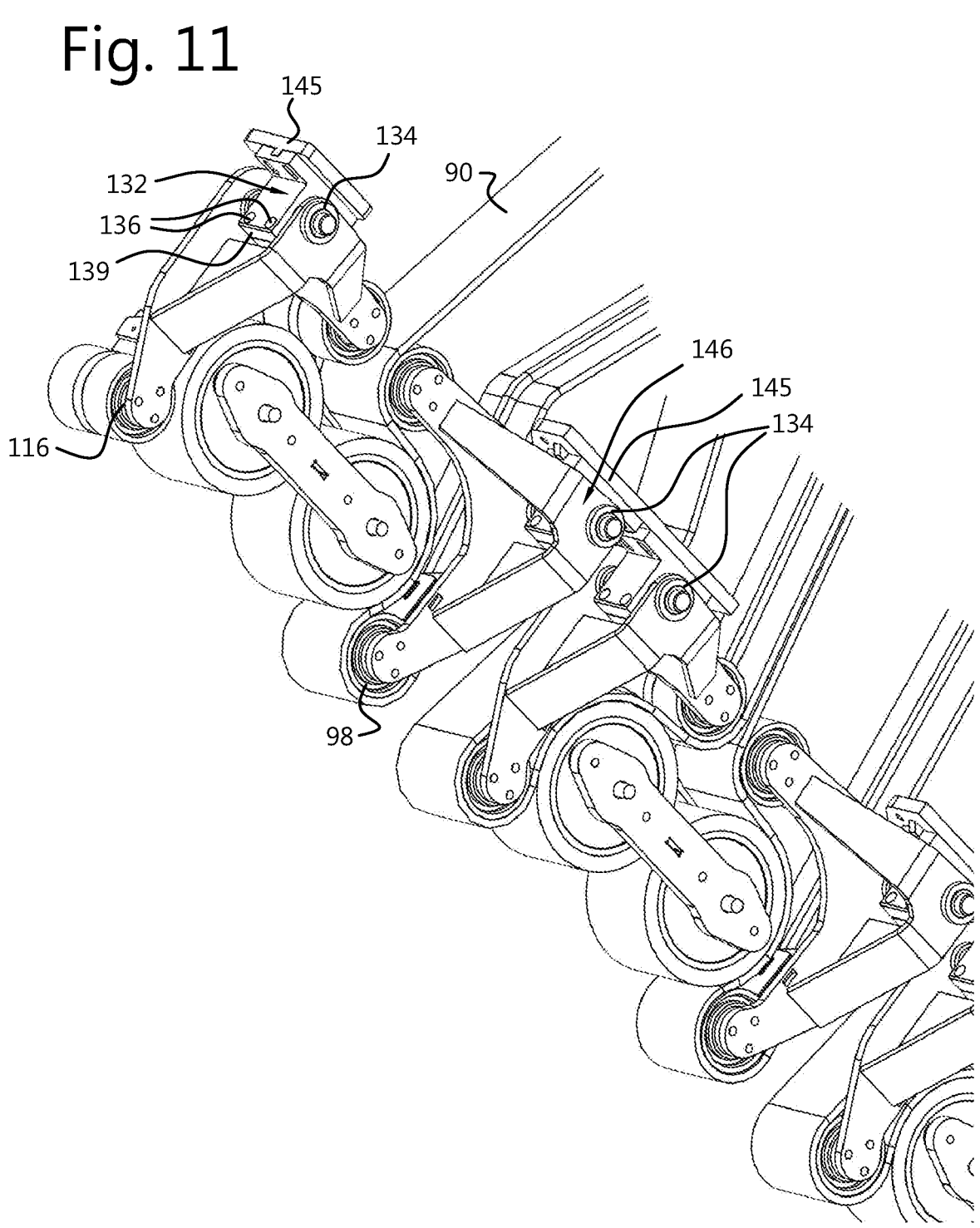
FIG. 11 is a detailed side view of a part of the processing unit of FIGS. 9 and 10.

FIGS. 8-10 show views of an embodiment of a picking element 25 of a picking unit comprising a plurality of drive motors 120 for the guide rollers 96, 96', 96", 97, 97', 97". Shown here are hydraulic and/or electric power supply lines 121 which lead to connecting points 122a, 122b on the rear side of the picking elements. These connecting points 122a, 122b can be coupled to corresponding connecting points on vehicle 1 The latter stated connecting points are connected via hydraulic and/or electric power supply lines (not shown) of vehicle 1 to respectively the above stated hydraulic pump unit for supplying a hydraulic drive medium for each of the drive motors 120, or an electric power source (not shown) provided for this purpose on vehicle 1, for instance the generator of the above stated combustion engine.

Picking element 25 can comprise one or more connecting points 122a, 122b for connecting the power supply means 121a, 121b to a power supply installation of vehicle 1. From these connecting points 122a, 122b the power supply lines 121a, 121b can follow the structural elements of the frame part 30 of picking element 25. This may reduce the chances of impedance or damage. It is possible to connect a plurality of motors 120 to the same power supply lines 121a, 121b. This is preferably done in series. In the embodiment shown in FIG. 9 two times three motors 120 are for instance connected in series to own power supply means 121a, 121b, each with their own connecting point 122a, 122b. It will be apparent to the skilled person that many variants are possible here.

Referring to FIGS. 6A and 6B, which show an example of an upper hemp picking element 26, transport installation 45, 46 grips in each case the upper parts (h$_2$) of the hemp plants (h) via each of the passages 41 and process them further. The upper parts (h$_2$) of the hemp plants are pulled inward into said passages. In the drawings a small number of fibre plants (h) is shown with black dots, although in practice this number will of course be much greater and a substantially continuous row of fibre plants will be transported between the endless conveyor belts 90, 91 and 90', 91'. As stated above, the cut-off fibre plants (h$_2$) extend in upward (vertical) direction in the first part of each of the passages, and further along in transport installation 45, 46 the cut-off hemp plants (h$_2$) are rotated through a quarter turn to a lying (substantially horizontal) position (fibre plant parts h$_2$ then being shown in broken lines). Once in this lying position, the fibre plants are transferred from an endless belt conveyor to a further endless belt conveyor (i.e. conveyor 50 of the upper hemp picking element 26 and conveyor 51 of the lower hemp picking element 25).

FIGS. 5, 6A and 6B show the operation of transport installation 45 and the turning over of the hemp plants in more detail. The two streams of hemp plants which enter via passages 41$^1$ and 41$^2$ converge between conveyor belts 90 and 91. The hemp plants (h$_2$) are then transported further between conveyor belts 90, 91 and, after having passed the driven guide pulley or guide roller 96, reach said collecting area 117. In the embodiment of FIGS. 6A and 6B the streams from passages 41$^1$/41$^2$ and 41$^3$/41$^4$ converge in this collecting area 117. FIG. 5 shows an embodiment where the combined streams of passages 41$^1$ and 41$^2$ on one side and the combined streams of a number of other passages on the other converge in collecting area 117. In the embodiment shown in FIGS. 6A and 6B these are passages 41' and 41$^4$, but in other embodiments they are the streams from passages 41$^3$, 41$^4$, 41$^5$ and 41$^6$ which in turn have already converged previously in a collecting area 117'.

As shown in FIGS. 5, 6A and 6B, both conveyor belt 90 of the first and second passages 41$^1$ and 41$^2$ and the conveyor belt 90' of the third and fourth passages 41$^3$-41$^4$ (or third to sixth passages in the embodiment of FIG. 5) are tilted after passing both guide rollers 102, 102' in that the respective belts 90, 90' are guided over guide rollers 112 having a rotation axis which lies perpendicularly of the rotation axis of rollers 102, 102'.

The picking and further processing of the upper parts (h$_2$) by means of the upper picking unit 26 is described in detail with reference to the figures. The lower parts (h1) of the hemp plants (h) are similarly picked and further processed by the lower hemp picking element 25. A detailed description of the way in which these lower parts (h$_1$) of the hemp plants are gripped and processed can therefore be dispensed with. The lower hemp parts (h$_1$) are gripped and carried along in similar manner by a transport installation 45, rotated through a half turn until they are in horizontal position and then discharged by a conveyor 51.

Referring to FIGS. 8-18, a part of a processing unit 129 is described in more detail. What follows below is a description of an embodiment of how the pressing rollers are arranged rotatably on a frame part 30 of the support frame of processing unit 129 in the front outer end of the processing unit 129 in order to provide the above described option of having the conveyor belts of the transport installation move away to some extent, for instance when a clod, stem or other large object finds its way into the transport installation or when one or more of the conveyor belts 90, 90' has a crease which causes an impediment when this conveyor belt must pass the guide rollers. The description is limited to the construction of the first passage 41$^7$ which is formed between conveyor belt 90 and support roller 92, 93, wherein at least one pressing roller of a group of two pressing rollers 98 and 113 tends to push the conveyor belt 90 against the support roller 92, 93. It will be apparent that a similar construction can be applied for each of the remaining passages 41$^1$-41$^6$, 41$^8$-41$^{12}$, both at the position of the lower picking element and at the position of the upper picking element of a hemp picking unit or at the position of the single picking element of a flax picking unit.

The support roller 92, 93 is a non-driven rotatable guide roller situated on the inner side of the transport path (and so on the inner side of conveyor belt 90 as well). In principle, this support roller 92, 93 is mounted on the relevant part 30 of the support frame in stationary manner, albeit that the support roller 92, 93 can spring in up and downward direction to some extent. For this purpose the support roller 92 is mounted on the support frame via a first mounting element 142, a leaf spring 140 and a second mounting element 141. The shown construction enables support roller 92, 93 to move up and downward when great forces are exerted thereon, but in principle not in lateral direction, or hardly so.

In the shown configuration the conveyor belt 90 is pressed against the stationary support roller 92 by pressing roller 94, 98. The fibre plants are situated in the space (i.e. the transport path) between conveyor belt 90 and support roller 92, 93. The (first) pressing roller 94, 98 is mounted rotatably on a rotatable support member 130. A second pressing roller 113 is likewise mounted rotatably on the per se already rotatable support member 130. This second pressing roller 113 is positioned at some distance from the first pressing roller 94, 98 (and from support roller 92, 93). The second pressing roller 113 presses against conveyor belt 90 at a (second) position such that the second pressing roller 113 still has space to rotate reciprocally. The second pressing roller 113 therefore in principle does not press the conveyor belt 90 against the support roller 92, 93. In embodiments of the invention the second pressing roller 113 and the conveyor belt 90 are always clear of the support roller 92, 93 in the second position.

Support member 130 is rotatable relative to an imaginary rotation point 147. This rotation point 147 is preferably located at a central position halfway between the position of pressing roller 94, 98 and the position of pressing roller 113. In other embodiments the imaginary rotation point is however shifted relative to the central position. As shown in the schematic top views of FIGS. 14A-14C, the support member 130 with the pressing rollers 98, 113 arranged thereon can be rotated reciprocally.

Figures 14A, 14B, 14C:
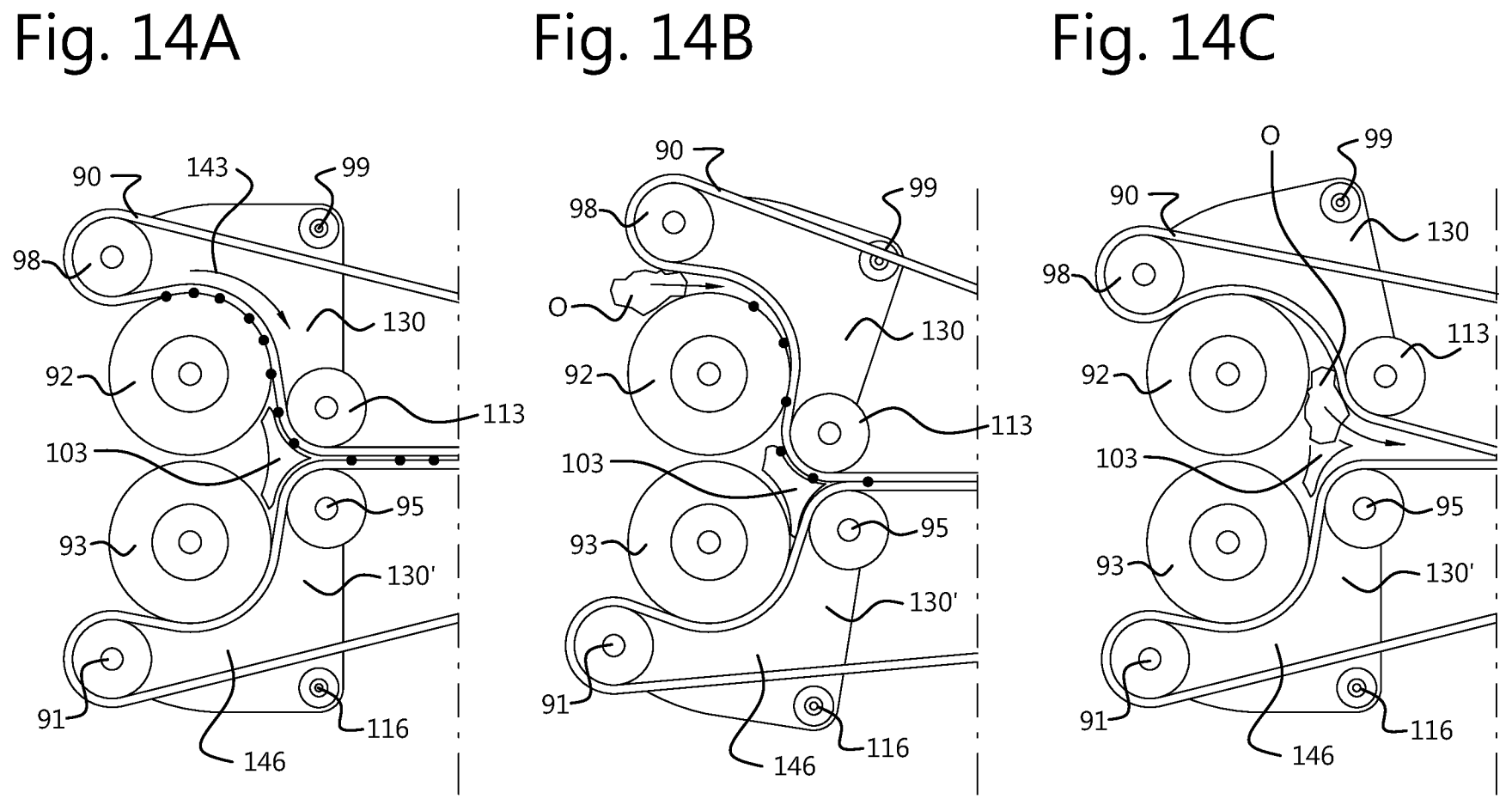

FIG. 14A shows the starting position of support member 130. It is clearly shown that the fibre plants (v) are transported in the transport direction 143 between conveyor belt 90 and the support roller 92, 93 (disposed in stationary manner in the operative state). The support member 130 is in a rotation position such that the two pressing rollers 98, 113 provide for a substantially constant (minimal) intermediate distance between the inner side of conveyor belt 90 and the outer side of support roller 92, 93. This intermediate distance is in principle equal to the intermediate distance between the inner side of conveyor belt 90 and the curved outer surface of the guide 103 positioned further along.

FIG. 14B shows that when a relatively large object (O), for instance a clod, comes to lie at the picking position, the support member 130 will begin to rotate (direction R₁) due to the presence of this object, so that the intermediate distance between the inner side of conveyor belt 90 and the outer side of support roller 92, 93 becomes a great deal bigger at the entrance to the transport path. This makes it possible also to transport the relatively large object (O) in the transport direction 143.

FIG. 14C shows the situation in which the object (O) has been transported further. Relative to the position shown in FIG. 14B, the rotatable support member 130 is rotated in opposite direction (R₂) to a position beyond the starting position shown in FIG. 14A. The object (O) is thus able to continue its way along the transport path.

It is otherwise noted that the same applies to the situation in which a relatively large object (O) is not (accidentally) picked, but in which a crease has formed in conveyor belt 90. The support member 130 will begin to rotate reciprocally in corresponding manner in order to enable the crease to pass. This reduces the risk of conveyor belt 90 becoming jammed.

The FIGS. 14A-14C clearly show that the rotatable support member 130 begins to rotate reciprocally. This is why the rotatable support member 130 is also referred to here as forming part of a tumbling element 146.

The tumbling element 146 comprises a rotatable support member 130 which has an elongate, curved form (more particularly, support member 130 has substantially an L-shape) in the shown embodiment, wherein the respective pressing rollers 98, 113 are arranged on the outer ends of the rotatable support member 130. The rotatable support member 130 of the tumbling element 146 is constructed from at least one support plate 131 and at least one flange 137 on the underside thereof. The flange 137 supports the support plate 131 of support member 130 so that the support plate 131 cannot bend too much.

Support plate 131 and flange 137 together define a U-shaped bracket 139. The bracket 139 is mounted on an upright rotation shaft 133 via two bearings 134, 135 provided in the free outer ends of the U-shaped bracket 139 so that support member 139 can rotate around said rotation shaft 133. Owing to the bracket construction with two pivot points lying some distance (above) each other, any torsion forces can be absorbed better so that support member 139 is able to support the two pressing rollers 98, 113 properly.

Figure 12:
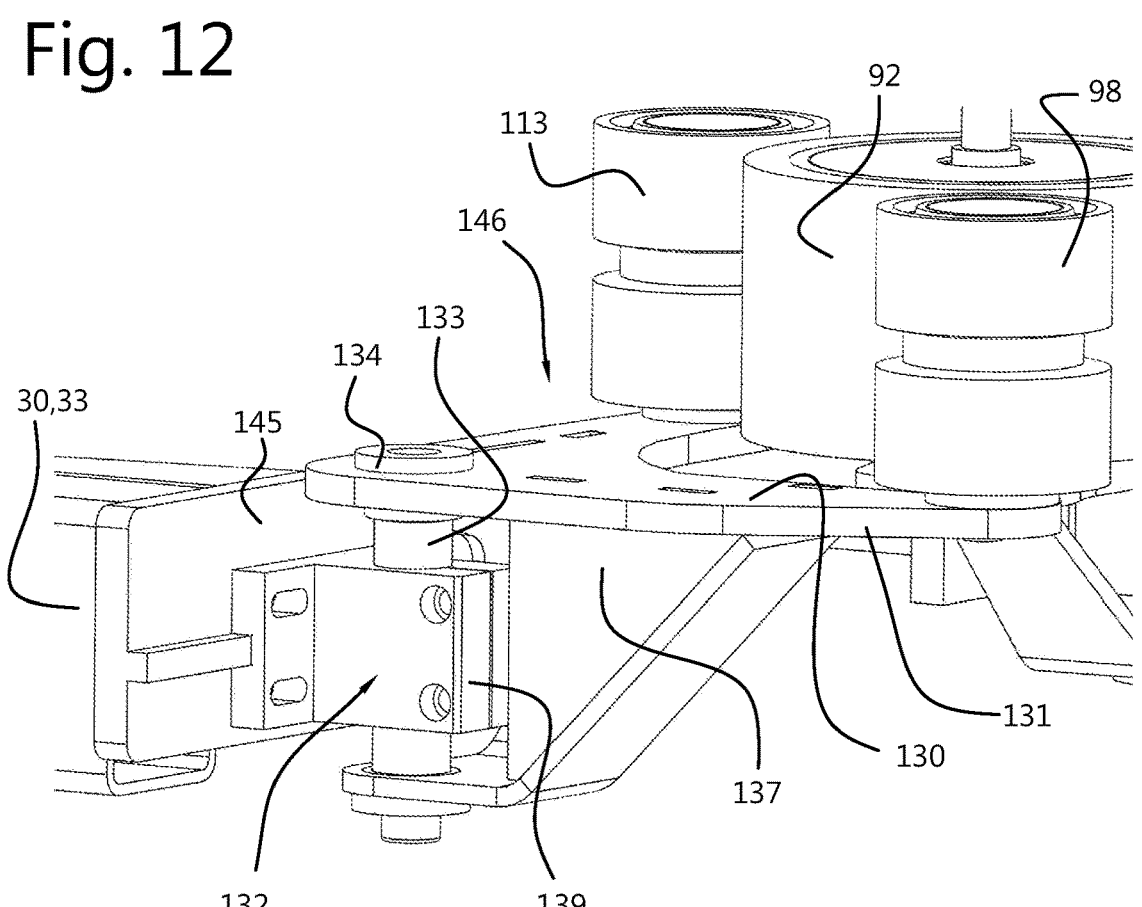
FIG. 12 is a further detailed side view of a rotation member, pressing rollers, a support roller and an outer end of the support frame, without conveyor belt.
Figure 13:
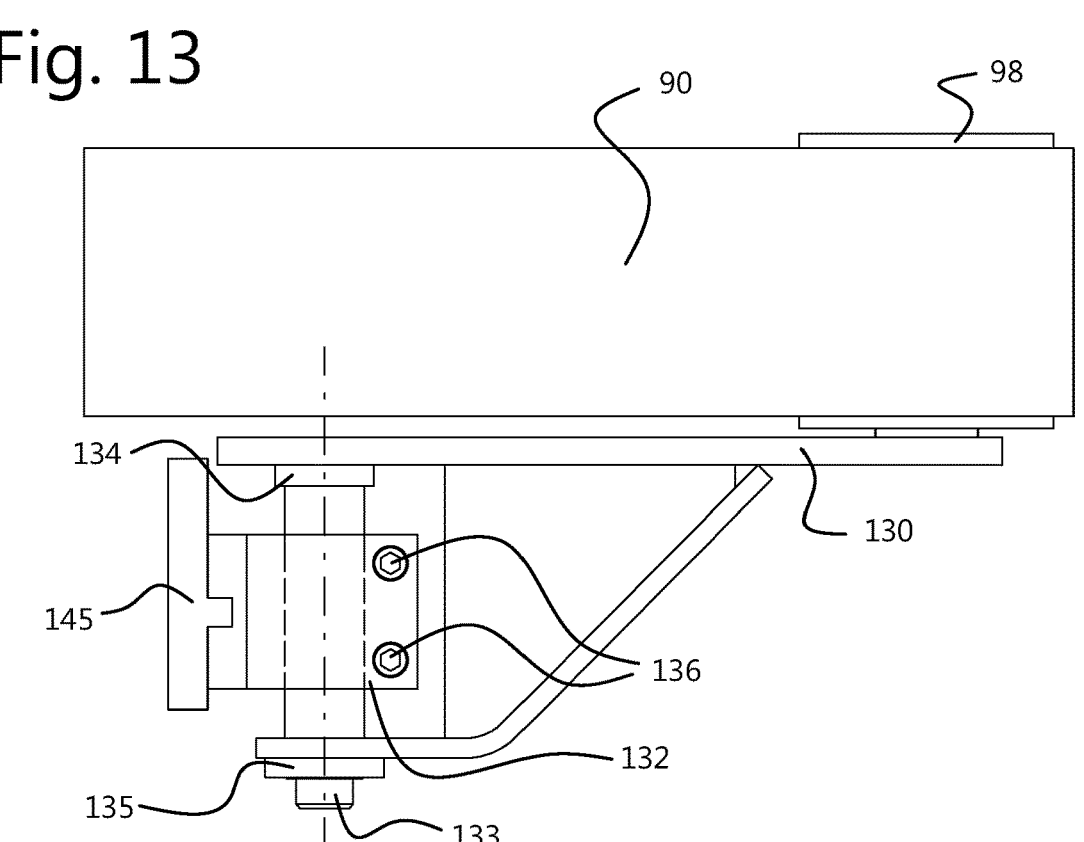
FIG. 13 is a side view of the embodiment of FIG. 12, with conveyor belt.

The rotation shaft 133 is mounted fixedly on the relevant frame part 30, 33 of the support frame via a clamping block 132 (see FIGS. 12 and 13). This clamping block 132 is on one side mounted via a mounting part 145 fixedly or adjustably on frame part 30 of the support frame or, on the other side, formed integrally therewith. This clamping block 132 surrounds the rotation shaft 133 and can be clamped fixedly thereon by clamping means suitable for this purpose, such as the clamping bolts 136 shown in the figures. The fixed clamping can take place at any (height) position along rotation shaft 133. This in fact means that height-adjusting means are provided whereby the height of support member 130 relative to the frame part 30 of the support frame can be set as desired (i.e. by releasing the clamping means (for instance loosening the clamping bolts 136), sliding the bracket 139 and the rotation shaft 133 mounted rotatably thereon upward or downward, and finally fixedly clamping the clamping block 132 in a desired final position again by fastening the clamping means (for instance by tightening clamping bolts 136)).

In use the first pressing roller 98 of tumbling element 146 presses the conveyor belt 90 against the support roller 92, 93. This second pressing roller 113 presses against conveyor belt 90 at some distance from the support roller 92, 93 and can move freely relative to support roller 92, 93. The second pressing roller 113 here defines the path of the conveyor belt, this such that when the first pressing roller 98 which presses against the support roller moves away, this at least one (second) pressing roller 113 can in principle freely move reciprocally (and thereby thus the first pressing roller 98 connected thereto via the support member 130 as well) in order to be able to accommodate this moving away of the first pressing roller 98. The second pressing roller 113 does simultaneously produce an opposing force here (this is because conveyor belt 90 wants to return to its starting position at the position of second pressing roller 113), so that the first pressing roller 98 will still continue to be pressed against conveyor belt 90. In other words, when conveyor belt 90 exerts a radial force on a first pressing roller 98 located at a first position, the tumbling construction ensures that the second pressing roller 113 located at the second position will begin to exert a radial opposing force on conveyor belt 90 at the same time. The fibre plants and/or the larger objects will hereby remain gripped tightly, and will not fall out of the transport installation.

In the shown embodiments the one or more support members are provided only at the respective front pressing rollers. The objects which are too large and/or the crease in the conveyor belts will in many cases have disappeared or have decreased at pressing rollers situated further toward the rear. It is noted here that the terms "front" and "rear" are related to the direction of travel of the self-propelling vehicle. The pivotable support frame is arranged on the front side of the self-propelling vehicle, as seen in direction of travel. The front pressing rollers are the pressing rollers which encounter the fibre plants first as a vehicle travels (and pick or pick up these fibre plants and then transport them further).

Figure 15:
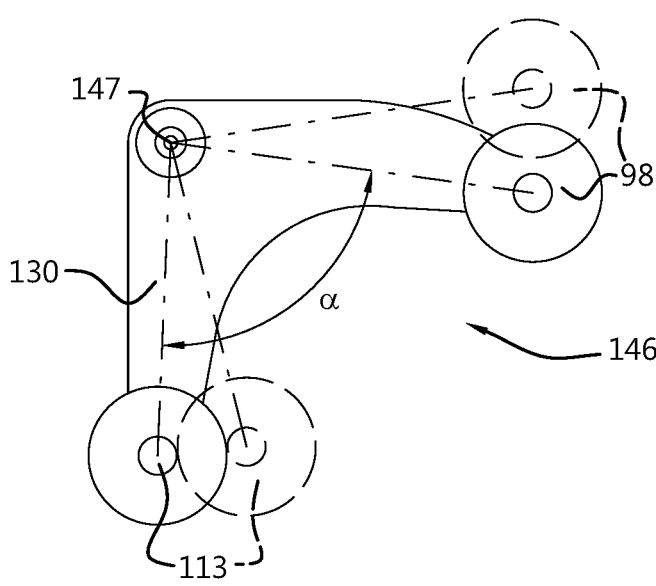
FIG. 15 is a schematic top view of a rotation member, in two different rotation positions and with an indication of the angle between the two outer ends of the rotation member.
Figures 16A, 16B:
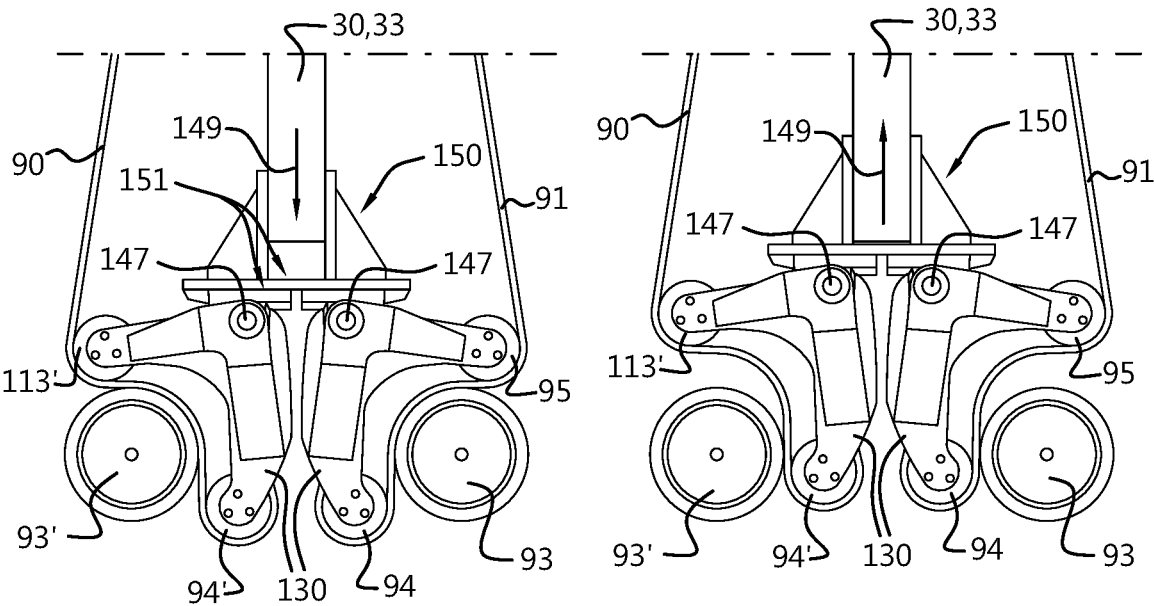
FIGS. 16A and 16B are schematic top views of two rotation members with conveyor belts of a further embodiment of a processing unit, in respectively an operative position and retracted position.

FIG. 15 shows that the mounting points of the at least two pressing rollers 98, 113 of the group and the imaginary rotation point 147 of support member 130 are positioned so that the angle (a) between a first line through the imaginary rotation point 147 and the mounting position of a first pressing roller and a second line through the imaginary rotation point and the mounting position of a second pressing roller lies in the range between 120° and 180°.

In the embodiments of FIGS. 7-13 the clamping block 132 is fixedly mounted via mounting part 145 on frame part 30, 33 of the support frame. This means that the pressing rollers are in principle only movable relative to the support frame in that the support member 130 is mounted rotatably on the support frame. In other embodiments, for instance in the embodiment of FIGS. 16A and 16B, the rotatable support member 130 is also displaceable in axial direction 149 between the operative position shown in FIG. 16A (in which position the processing unit picks or picks up the fibre plants) and the retracted position shown in FIG. 16B (in which position the conveyor belt lies relatively loosely round the guide rollers). In the latter stated position the tension on conveyor belts 90, 91 will be lower than in the operative state, or the conveyor belts 90, 91 can even hang slackly round the guide rollers, especially in embodiments in which not only the pressing rollers 94, 94', 98, 113 and so on but also the drive rollers 96, 97 and so on are adjustable in axial direction (wherein the pressing rollers 94, 113 and drive rollers 96, 97 are then preferably displaceable in directions toward each other). The displaceability of the rotatable support member 130 with the pressing rollers thereon (and optionally the displaceability of the drive rollers) thus provides the option of adjusting the axial position of support member 130, and thereby of pressing rollers 98, 113, before or after picking or picking up of the fibre plants, and thereby enabling conveyor belts 90, 91 to be exchanged in simple manner or any blockages in the fibre plant transport line (i.e. the transport path) to be removed.

In order to realize the adjustability the processing unit comprises a support member retracting mechanism 150 in determined embodiments of the invention. The support member retracting mechanism 150 can for instance comprise an axially displaceable mounting part 151 instead of the above stated fixed mounting part 145. The mounting part 151 can be plate-like or tubular and can be embodied to be arranged over a corresponding part of the support frame 30, 33, this such that the mounting part 151 is slidable along the support frame. Other embodiments are of course also possible. The support member retracting mechanism should in any case be suitable for displacing the support member 130 in axial directions. To drive the displacement of the displaceable mounting part 151 use can be made of an actuator which is mounted on support frame 30, 33 on one side and is mounted on mounting part 151 on the other. The actuator can for instance comprise a hydraulic or pneumatic extending cylinder or an electric motor. The actuator can for instance be positioned in the stationary support frame 30, 33 and be embodied such that one outer end is connected to the displaceable mounting part 151 and the opposite outer end is connected to the stationary support frame. An example of such an actuator is shown in more detail in FIGS. 18A-18D. Application of a manually operated mechanical actuator is likewise possible.

Figure 17A:
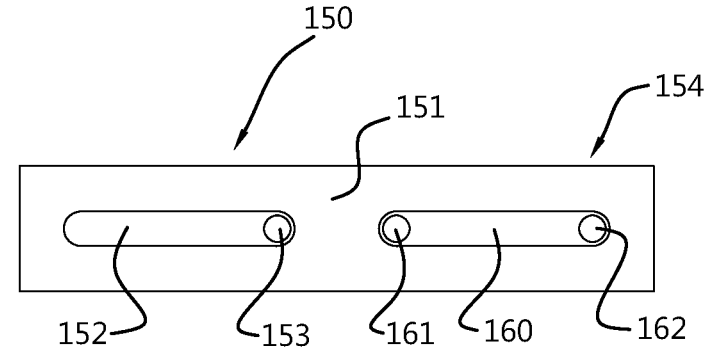
FIGS. 17A-17C are respective side views of different positions of the support member retracting mechanism, wherein the actuator is a manually operated, mechanical actuator.
Figure 17B:
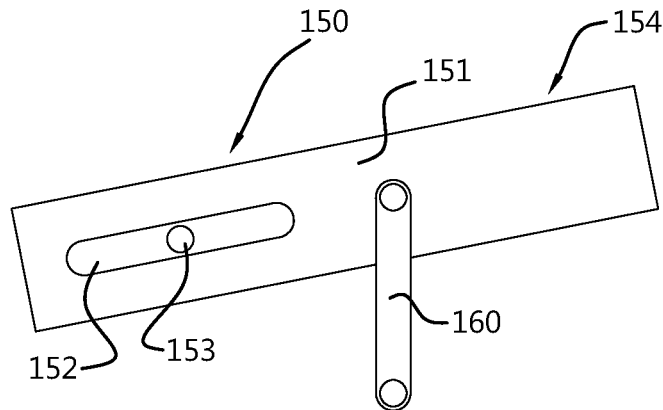
Figure 17C:
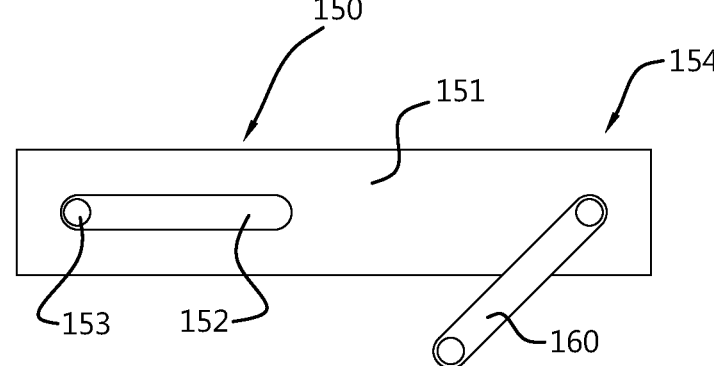
Figure 18A:
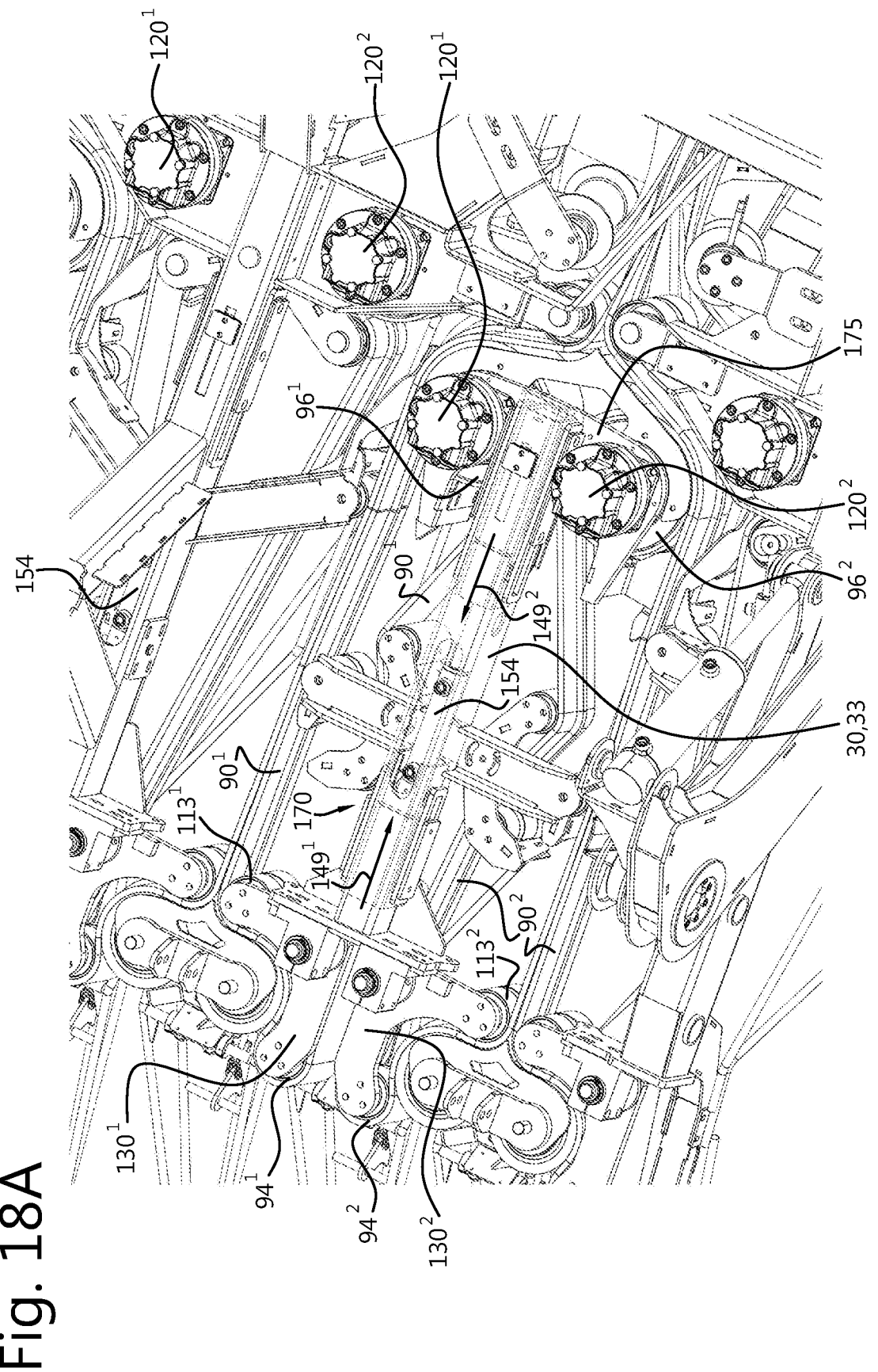
FIGS. 18A-18D are respective, increasingly partially cutaway bottom views of a further embodiment wherein the support member retracting mechanism is suitable not only for simultaneously retracting two support members, but at the same time also retracting two (or more) drive pulleys.
Figure 18B:
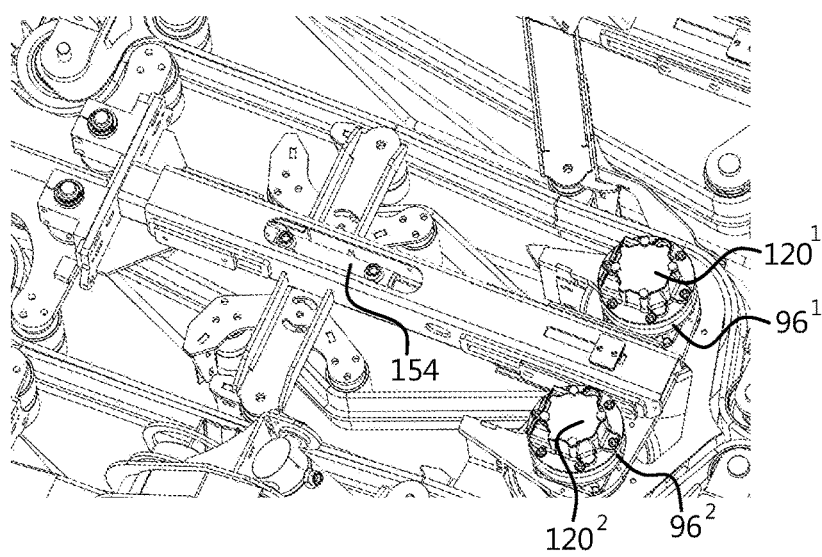
Figure 18C:
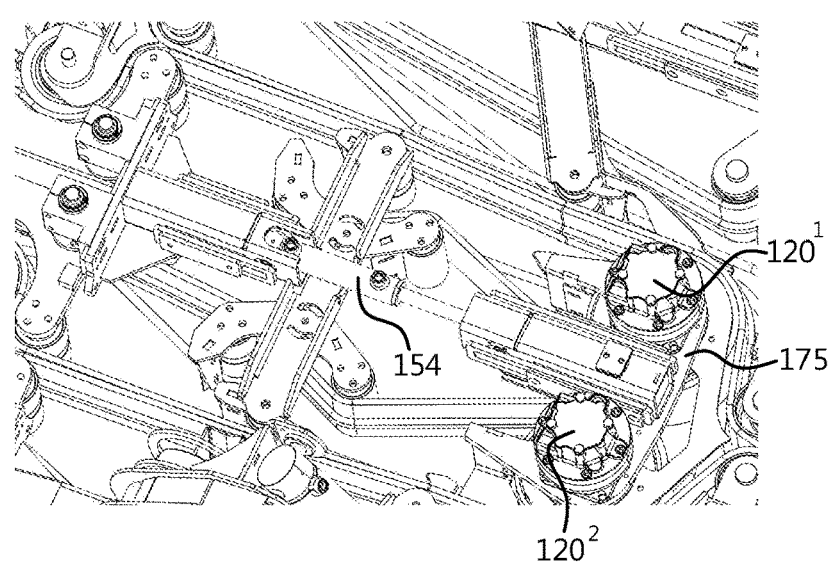
Figure 18D:
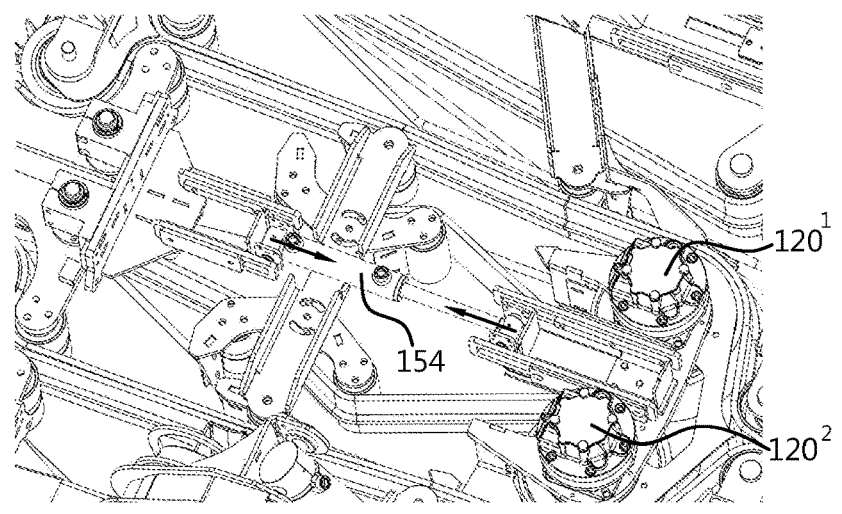

FIGS. 17A-17C show an example of a (pressing roller) support member retracting mechanism 150 wherein use is made of a mechanical actuator. Mounting part 151 comprises an elongate opening 152 in which a mounting pin 153 attached to support frame 30, 33 is freely slidable. The mounting pin 153 is here formed such that the mounting part 151 always remains mounted on the support frame, but it is possible to displace the mounting part 151 in at least the axial direction relative to the support frame. When displacing the mounting part 151 from the starting position shown in FIG. 17A, via the intermediate position shown in FIG. 17B to the retracted position shown in FIG. 17C, the mounting part 151 is displaced rearward, in other words retracted, over a distance corresponding to the length of the elongate opening 152. This enables a reduction of the tension on conveyor belt 90, optionally for being able to replace the conveyor belt in relatively simple manner.

As stated above, the support member retracting mechanism 150 comprises a drive in the form of an actuator 154 whereby the displacement of mounting part 151 along the support frame can be driven. This actuator can be a hydraulic or electric actuator 154 (see for instance partially cut-away FIGS. 18A-18D). An advantage of such an actuator is that it makes it simple to control the axial position of support member 130 from the driver's cab, for instance immediately before or immediately after the picking/picking up (wherein the axial position of support member 130 during the picking or picking up is itself in principle always fixed). In determined further embodiments, for instance in the embodiment of FIGS. 18A-18D to be described below, the actuator is the same actuator (for instance extending cylinder 154) as can also be used for adjusting the drive pulleys 96 and 96' in axial direction.

In the embodiment shown in FIGS. 17A-17C use is however made of a mechanical drive. This mechanical drive comprises for instance a connecting rod 160 which is mounted pivotally on mounting part 151 on one side and on frame 30, 33 on the other via hinges 161 and 162. When connecting rod 160 is in the position shown in FIG. 17A, it has been displaced beyond its dead point so that the mounting part 151 will in principle not return on its own. The connecting rod 160 can in this position for instance be locked in order to ensure that it is not possible for mounting part 151 to be adjusted during operation. The mounting part 151 can however be adjusted after unlocking, by rotating the connecting rod 160 as shown in FIGS. 17B and 17C.

FIGS. 18A-18D show a specific embodiment wherein the support retracting mechanism 170 is configured not only to displace two support members with pressing rollers 94 in axial direction (rearward), but also to simultaneously displace the drive rollers 96, 97 in axial direction (forward direction, so opposite to the axial direction of the support members). The support member retracting mechanism 170 corresponds to the support member retracting mechanism 150 and a detailed description of the part responsible for the axial displacement of the rotatable support members is dispensed with here for the sake of simplicity. The support member retracting mechanism 170 is however also embodied also to retract the drive rollers 96, 97 simultaneously to retracting the two support members (so that the support members and drive rollers 96, 97 come to lie at a shorter distance from each other and the conveyor belt thereby becomes slacker, so that it can (for instance) be replaced more easily.

The figures show an actuator 154 in the form of an extending cylinder which is positioned inside the frame part 30, 33. When the actuator 154 is operated, for instance by reducing the length of the extending cylinder, the one outer end of the extending cylinder pulls two rotatable support members 130$^1$, 130$^2$ with the pressing rollers 94 mounted thereon rearward in axial direction 149$^1$, and the other, opposite outer end of the same extending cylinder pulls a drive roller support 175 with the two drive rollers 96, 97 mounted thereon (and also the corresponding drive motors 120) associated with the same conveyor belt 90, 91 forward in axial direction 149$^2$ (see FIG. 18A). The conveyor belt 90, 91 hereby becomes slack to an extent such that it can be removed and can be replaced with another conveyor belt in relatively simple manner. After this, the extending cylinder extends once again, and the conveyor belt 90, 91 is brought to sufficient tension again.

The present invention is not limited to the embodiments described herein. The rights sought are defined by the following claims, within the scope of which numerous modifications can be envisaged.

The invention claimed is:

1. A processing machine to process fiber plants, the processing machine comprising:

a self-propelling vehicle comprising a vehicle chassis including a plurality of wheels on the vehicle chassis and a drive motor configured to drive at least two wheels; and a processing system configured to pick fiber plants or pick the fiber plants up from a ground surface, the processing system comprising:

a support frame pivotally mounted or mountable on the vehicle chassis, a transport installation mounted on the pivotable support frame and configured to transport the fiber plants to the self-propelling vehicle, the transport installation comprising:

a plurality of guide rollers mounted on the support frame, at least one drive configured to drive at least a part of the guide rollers, at least one pair of endless conveyor belts guided along the guide rollers, the guide rollers and the at least one pair of endless conveyor belts being configured to grip the fiber plants therebetween and transport the fiber plants in a gripped state to the self-propelling vehicle, the guide rollers comprising:

at least one group of at least two pressing rollers which are configured to press against a first side of one of the endless conveyor belts at two or more positions, and at least one support roller which is configured to press against a second, opposite side of the conveyor belt, and at least one support member on which the at least one group of at least two pressing rollers is rotatably disposed, the at least one support member being mounted on the support frame rotatably relative to a rotation point; and a support member retracting mechanism configured to displace the at least one support member with the pressing rollers rotatably disposed thereon in an axial direction.

2. The processing machine according to claim 1, wherein the support member retracting mechanism is configured to adjust an axial position of the rotation point of the support member.

3. The processing machine according to claim 2, wherein the support member retracting mechanism comprises a mounting part which is displaceably mounted on the support frame.

4. The processing machine according to claim 3, wherein the mounting part comprises a plate or tubular profile provided with an axial slot, which is disposed around the support frame, the support frame comprising a mounting pin disposed in the axial slot.

5. The processing machine according to claim 1, wherein the support member retracting mechanism comprises an actuator configured to drive displacement of the at least one rotatable support member relative to the support frame.

6. The processing machine according to claim 1, wherein the at least one rotatable support member comprises two rotatable support members, the support member retracting mechanism being configured to simultaneously displace the two rotatable support members in an axial direction, each of the two rotatable support members being provided with two of the pressing rollers disposed rotatably thereon.

7. The processing machine according to claim 1, wherein the at least two pressing rollers of one group of the at least one group are disposed on the at least one support member on either side of the rotation point.

8. The processing machine according to claim 1, wherein one or more of:

(i) the rotation point is situated substantially in the center of the at least one support member, and (ii) the at least one support member is a tumbling element.

9. The processing machine according to claim 1, wherein one or more of:

(i) the at least one support member has an elongate form, (ii) the at least two pressing rollers of one group of the at least one group being disposed on opposite outer ends of the at least one support member, and (ii) the rotation point around which the at least one support member is rotatable lies substantially centrally between outer ends of the at least one support member.

10. The processing machine according to claim 1, wherein a plurality of mounting points of the at least two pressing rollers of one of the at least one group and the rotation point of the at least one support member are positioned such that the angle between a first line through the rotation point and a mounting position of a first pressing roller and a second line through the rotation point and a mounting position of a second pressing roller lies in the range between 120° and 180°.

11. The processing machine according to claim 1, wherein the at least one support member is configured to have a second pressing roller located at a second position simultaneously exert a radial opposing force on one of the endless conveyor belts when the respective conveyor belt exerts a radial force on a first pressing roller located at a first position.

12. The processing machine according to claim 1, wherein one or more of:

(i) the endless conveyor belts are manufactured from elastic material, and (ii) at least one of the guide rollers is spring-mounted on the support frame.

13. The processing machine according to claim 1, wherein only the respective front pressing rollers of each pair of endless conveyor belts are mounted on a respective rotatable one of the at least one support member.

14. The processing machine according to claim 1, wherein a pair of the at least one pair of endless conveyor belts comprises a first conveyor belt and a second conveyor belt, the first and second conveyor belt being disposed against each other along a part of a transport path.

15. The processing machine according to claim 14, wherein the transport installation is configured to transport the fiber plants for part of a transport in a state in which the fiber plants are confined between one of the guide rollers and one of the endless conveyor belts, and for another part in a state in which the fiber plants are confined between the first and second conveyor belts.

16. The processing machine according to claim 1, wherein the transport installation comprises, for each of the at least one group of at least two pressing rollers, a respective opposite guide roller which is situated on an inner side of the respective pair of conveyor belts, making contact with an inner, first side of a respective one of the endless conveyor belts, the at least two pressing rollers of the group being situated on the outer side of the respective conveyor belt, making contact with an outer, second side of the respective conveyor belt.

17. The processing machine according to claim 16, wherein the opposite guide roller is spring-mounted on the support frame, and is coupled to the support frame via only one or more leaf springs.

18. The processing machine according to claim 1, wherein said at least one support roller is spring-mounted on the support frame of the processing system, the at least one support roller being coupled to the support frame via only one or more leaf springs.

19. The processing machine according to claim 1, wherein the endless conveyor belts are configured to move away with the first pressing roller of the group moving relative to the at least one support roller by rotation of the support member and the second pressing roller of the group being simultaneously pressed further against the conveyor belt by the rotation.

20. The processing machine according to claim 1, further comprising a mounting system configured to mount the at least one support member rotatably on the support frame.

21. The processing machine according to claim 20, wherein the mounting system comprises at least two rotation elements which are configured to mount the at least one support member rotatably on the support frame at at least two different height positions.

22. The processing machine according to claim 20, wherein the mounting system is configured to adjust the position of the at least one support member and the pressing rollers mounted thereon relative to the position of the endless conveyor belts, the mounting system being configured to adjust a height position of the pressing rollers relative to the adjacent conveyor belts.

23. The processing machine according to claim 20, wherein the mounting system comprises:

a pivot shaft rotatably mounted on the at least one support member at the position of the rotation point, a clamping element mounted on the support frame or formed therewith, and a clamping system configured to clamp the clamping block fixedly onto the pivot shaft at a specific position.

24. The processing machine according to claim 1, wherein the support member comprises a substantially L-shaped support plate with one of the pressing rollers at each of outer ends of the L-shaped support plate.

25. The processing machine according to claim 1, wherein the support member comprises a flange provided on the underside of a support plate, wherein a pivot shaft is arranged rotatably on both the support plate and the flange.

26. The processing machine according to claim 1, wherein the processing system is a picking system which is configured to pick the fiber plants and to transport the fiber plants to the self-propelling vehicle.

27. The processing machine according to claim 1, further comprising:

at least one fiber plant conveyor disposed on the vehicle chassis of the self-propelling vehicle to receive the fiber plants from the at least one pair of endless conveyor belts of the processing system at a first outer end of the at least one fiber plant conveyor and to transport at least parts of the fiber plants to an opposite, second outer end of the at least one fiber plant conveyor; and at least one delivering system disposed at or close to the second outer end to deliver and place the fiber plants coming from the at least one fiber plant conveyor on the ground surface, the at least one delivering system being disposed on the vehicle chassis.

28. The processing machine according to claim 1, wherein the at least one pair of endless conveyor belts comprises a plurality of front pressing rollers, and at least the respective front pressing rollers of each of the at least one pair of endless conveyor belts are mounted on a respective one of the at least one support member.

29. The processing machine according to claim 1, wherein each conveyor belt pair has a corresponding support element.

30. The processing machine according to claim 1, wherein the guide rollers comprise at least one drive roller coupled to the at least one drive and configured to drive one of the endless conveyor belts.

31. The processing machine according to claim 30, wherein one or more drive rollers of the at least one drive roller are mounted on a drive roller support, and the drive roller support is mounted on the support frame for displacement in the axial direction.

32. The processing machine according to claim 31, wherein the support member retracting mechanism is configured to displace the at least one support member in a first axial direction and to displace the drive roller support in a second axial direction, opposite to the first axial direction, wherein the support member retracting mechanism is configured to displace the at least one support member in the first axial direction and the drive roller support in the second axial direction simultaneously.

33. The processing machine according to claim 30, wherein the at least one drive comprises one or more hydraulic motors which drive one or more of the drive rollers.

* * * * *